United States Patent
Epp et al.

(10) Patent No.: US 8,897,757 B2
(45) Date of Patent: Nov. 25, 2014

(54) SYSTEM AND METHOD FOR AUTOMATICALLY ANSWERING A CALL ON A COMMUNICATION DEVICE

(75) Inventors: Anton Epp, Breslau (CA); Gregory Jason Fields, Waterloo (CA); Peter Hantzakos, Toronto (CA)

(73) Assignee: BlackBerry Limited, Waterloo (CA)

( * ) Notice: Subject to any disclaimer, the term of this patent is extended or adjusted under 35 U.S.C. 154(b) by 0 days.

(21) Appl. No.: 13/635,134

(22) PCT Filed: Apr. 27, 2011

(86) PCT No.: PCT/CA2011/000463
§ 371 (c)(1),
(2), (4) Date: Sep. 14, 2012

(87) PCT Pub. No.: WO2012/145815
PCT Pub. Date: Nov. 1, 2012

(65) Prior Publication Data
US 2013/0189963 A1 Jul. 25, 2013

(51) Int. Cl.
| H04M 3/00 | (2006.01) |
| H04M 1/64 | (2006.01) |
| H04M 3/42 | (2006.01) |
| H04W 4/16 | (2009.01) |

(52) U.S. Cl.
CPC .......... *H04M 3/42212* (2013.01); *H04M 1/64* (2013.01); *H04W 4/16* (2013.01)
USPC .................. 455/414.1; 379/266.07; 379/80; 379/88.01

(58) Field of Classification Search
CPC . H04M 1/64; H04M 3/42221; H04M 3/5138; H04M 2203/2027; H04M 1/642; H04M 1/57; H04W 4/16; H04W 4/22; H04W 76/028; H04W 76/06; H04W 28/08
USPC ................... 379/265, 72–80, 201, 88.01, 69; 455/412–414.1, 90, 569, 564, 567
See application file for complete search history.

(56) References Cited

U.S. PATENT DOCUMENTS

| 3,864,520 A | 2/1975 | Owen |
| 4,903,291 A | 2/1990 | Tsurufuji et al. |
| 5,606,593 A | 2/1997 | Smith |
| 5,636,265 A | 6/1997 | O'Connell et al. |

(Continued)

FOREIGN PATENT DOCUMENTS

| EP | 1134960 A2 | 9/2001 |
| GB | 2260878 A | 4/1993 |

OTHER PUBLICATIONS

Lucent Technologies; Definity Enterprise Communications Server Release 7, 8101 Telephone User's Guide, 1999, USA.

(Continued)

*Primary Examiner* — Nizar Sivji
(74) *Attorney, Agent, or Firm* — Blake, Cassells & Graydon LLP; Wilfred P. So; Brett J. Slaney

(57) ABSTRACT

A system and method for answering a call on a communication device is provided and includes: detecting an incoming call on the communication device, automatically answering the incoming call, and detecting whether an audio signal is received through the microphone of the communication device. Upon not detecting an audio signal, the call is disconnected.

19 Claims, 21 Drawing Sheets

(56) References Cited

U.S. PATENT DOCUMENTS

| | | | |
|---|---|---|---|
| 5,675,639 A | 10/1997 | Itani | |
| 6,459,902 B1* | 10/2002 | Li et al. | 455/453 |
| 6,470,077 B1* | 10/2002 | Chan | 379/88.01 |
| 7,433,715 B2* | 10/2008 | Buckley et al. | 455/569.1 |
| 2004/0198461 A1 | 10/2004 | Coombes | |
| 2008/0305763 A1* | 12/2008 | Wijayanathan et al. | 455/404.2 |
| 2009/0124281 A1* | 5/2009 | Takamune et al. | 455/550.1 |
| 2010/0216509 A1 | 8/2010 | Riemer et al. | |
| 2012/0020348 A1* | 1/2012 | Haverinen et al. | 370/339 |
| 2012/0050455 A1* | 3/2012 | Santamaria et al. | 348/14.11 |

OTHER PUBLICATIONS

Cisco; Cisco Unified Communications Manager Express System Administrator Guide, 2008; retrieved Mar. 9, 2011, from Configuring Headset Auto-Answer: http://www.cisco.com/en/US/docs/voice_ip_comm/cucme/admin/configuration/guide/cmeanswr.html.

Halevy Ronen; Drive Safe with HandsFree App Automatically Answers Calls, 2010; retrieved Mar. 8, 2011, from Berry Review: http://www.berryreview.com/2010/12/07/drive-safe-with-handsfree-app-automatically-answers-calls/.

Wordspace; Auto Answer, 2010; retrieved Mar. 9, 2011, from BlackBerry App World; https://appworld.blackberry.com/webstore/content/8396.

Scarcer; Drive Safe with HandsFree, 2010; retrieved Mar. 8, 2011, from BlackBerry App World; http://appworld.blackberry.com/webstore/content/703?lang=en.

Everysoft; Auto Answer ~ Android Application V1.5 by EverySoft/Communicaton, 2010; retrieved Mar. 8, 2011, from AndroLib; http://www.androlib.com/android.application.com-everysoft-autoanswer-ApiA.aspx.

Everysoft;IBluetoothHeadset.aidl—auto-answer—Project Hosting on Google Code, 2010; retrieved Mar. 8, 2011, from Android AutoAnswer: http://code.google.com/p/auto-answer/source/browse/trunk/src/android/bluetooth/IBluetoothHeadset.aidl.

Everysoft; ITelephony.aidi—auto-answer—Project Hosting on Google Code, 2010; retrieved Mar. 8, 2011, from Android AutoAnswer: http://code.google.com/p/autoanswer/source/browse/trunk/src/com/android/internal/telephony/ITelephony.aidl.

Everysoft; AutoAnswerBootReceiver.java—auto-answer—Project Hosting on Google Code, 2010; retrieved Mar. 8, 2011, from Android AutoAnswer: http://code.google.com/p/auto-answer/source/browse/trunk/src/com/everysoft/autoanswer/AutoAnswerBootReceiver.java.

Everysoft; AutoAnswerIntentService.java—auto-answer—Project Hosting on Google Code, 2010; retrieved Mar. 8, 2011, from Android AutoAnswer: http://code.google.com/p/auto-answer/source/browse/trunk/src/com/everysoft/autoanswer/AutoAnswerIntentService.java.

Everysoft; AutoAnswerNotifier.java—auto-answer—Project Hosting on Google Code, 2010; retrieved Mar. 8, 2011, from Android AutoAnswer: http://code.google.com/p/auto-answer/source/browse/trunk/src/com/everysoft/autoanswer/AutoAnswerNotifier.java.

Everysoft; AutoAnswerPreferenceActivity.java—auto-answer—Project Hosting on Google Code, 2010; retrieved Mar. 8, 2011, from Android AutoAnswer: http://code.google.com/p/auto-answer/source/browse/trunk/src/com/everysoft/autoanswer/AutoAnswerPreferenceActivity.java.

Everysoft; AutoAnswerReceiver.java—auto-answer—Project Hosting on Google Code, 2010; retrieved Mar. 8, 2011, from Android AutoAnswer: http://code.google.com/p/auto-answer/source/browse/trunk/src/com/everysoft/autoanswer/AutoAnswerReceiver.java.

Everysoft; BluetoothHeadset.java—auto-answer—Project Hosting on Google Code, 2010; retrieved Mar. 8, 2011, from Android AutoAnswer: http://code.google.com/p/auto.answer/source/browse/trunk/src/com/everysoft/autoanswer/BluetoothHeadset.java.

Everysoft; AutoAnswerDialogPreference.java—auto-answer—Project Hosting on Google Code, 2010; retrieved Mar. 8, 2011, from Android AutoAnswer: http://code.google.com/p/auto-answer/source/browse/trunk/src/com/everysoft/autoanswer/preference/AutoAnswerDialogPreference.java.

Hyam Kristy; International Search Report from corresponding PCT Application No. PCT/CA2011/000463; search completed Dec. 12, 2011.

Molinari, Fausto; Supplemental European Search Report from corresponding EP application No. EP11864523; search completed Sep. 30, 2014.

* cited by examiner

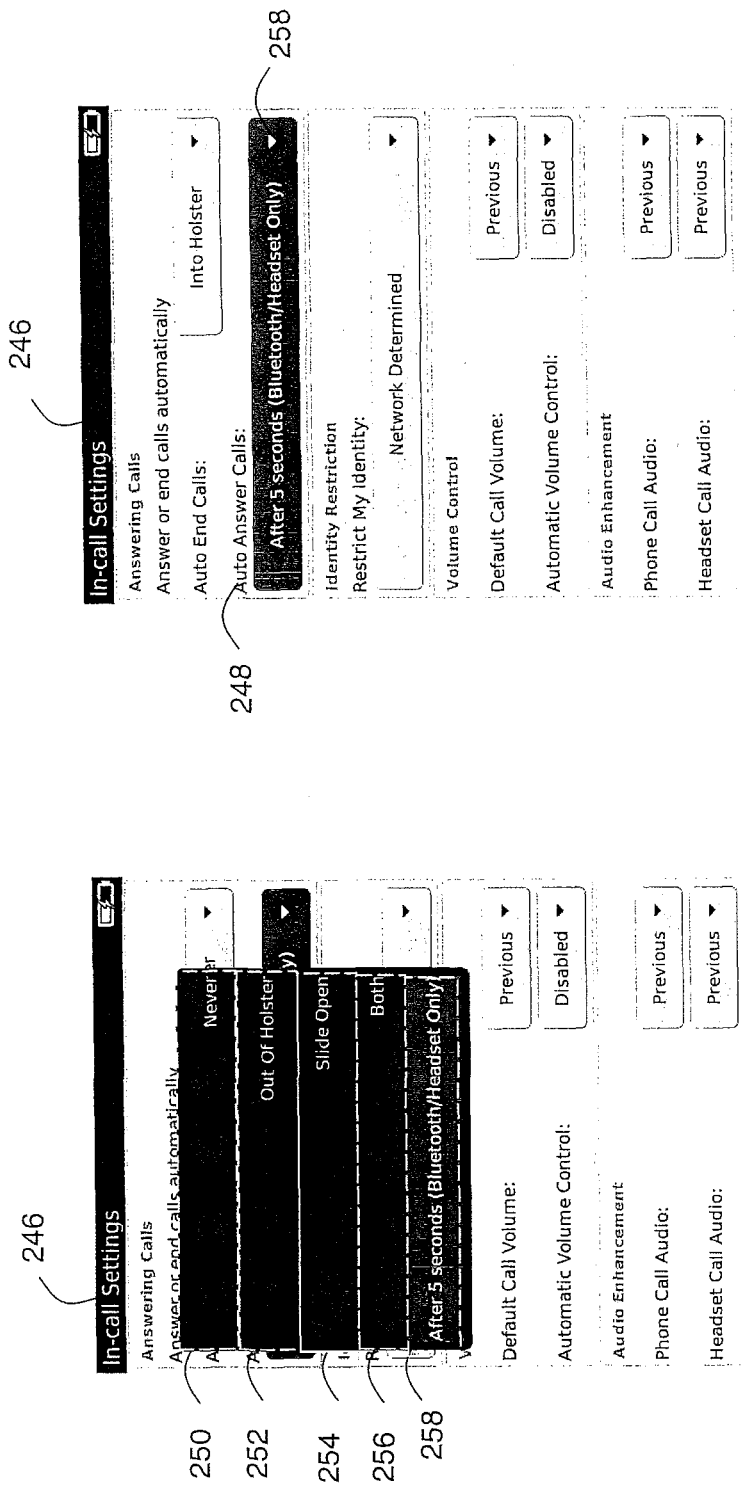

SYSTEM AND METHOD FOR AUTOMATICALLY ANSWERING A CALL ON A COMMUNICATION DEVICE

TECHNICAL FIELD

The following relates to systems and methods for automatically answering a call on a communication device.

BACKGROUND

Telephones are used for real-time remote verbal communication. Recently, with the popularity of mobile communication devices such as mobile telephones or smartphones, users have been able to perform an activity such as driving or walking concurrently while having a phone conversation. Traditionally, during a telephone conversation, the user is required to hold a handset including a microphone and a speaker with the speaker adjacent to the user's ear. Some activities require the use of both hands and hence, traditional operation of a mobile device may be difficult or dangerous.

More recently, communication headsets including a microphone and an earpiece have been introduced and can be worn during activities such as driving, allowing a user to communicate over a mobile device without requiring the user to manually hold the device to the ear.

BRIEF DESCRIPTION OF THE DRAWINGS

Embodiments will now be described by way of example only with reference to the appended drawings wherein:

FIG. 9 is a screenshot of an example graphical user interface (GUI) that allows a user to enable the automatic answering feature to answer a call according to certain criteria.

FIG. 10 is a screenshot similar to FIG. 9 showing an example embodiment of the automatic answering feature being enabled to answer a call five seconds after detecting the call and if a communications headset is connected.

DETAILED DESCRIPTION

Figure 1:
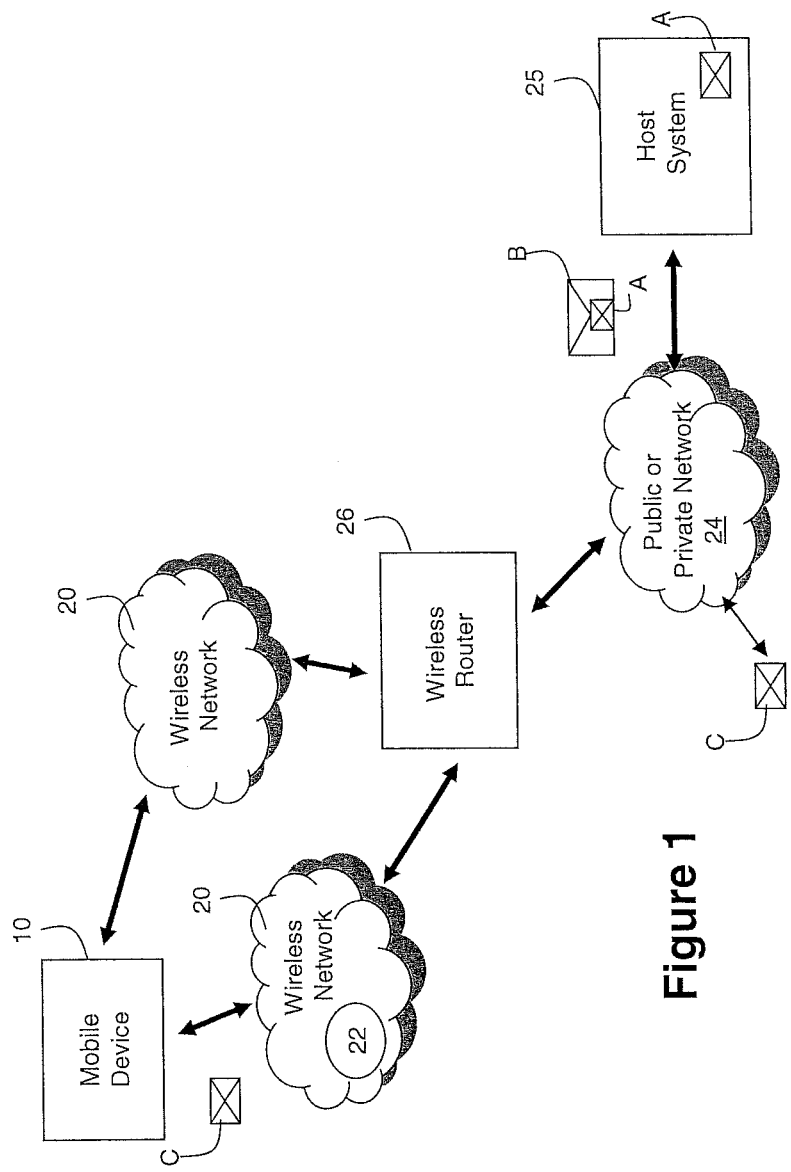
FIG. 1 is a schematic diagram illustrating an example system in which data items are pushed from a host system to a mobile device.

It will be appreciated that for simplicity and clarity of illustration, where considered appropriate, reference numerals may be repeated among the figures to indicate corresponding or analogous elements. In addition, numerous specific details are set forth in order to provide a thorough understanding of the example embodiments described herein. However, it will be understood by those of ordinary skill in the art that the example embodiments described herein may be practiced without these specific details. In other instances, well-known methods, procedures and components have not been described in detail so as not to obscure the example embodiments described herein. Also, the description is not to be considered as limiting the scope of the example embodiments described herein.

When a user of a communication device receives a call, typically the user is required to abandon the activity in which he is engaged or otherwise reduce his attention towards the activity to accept a call by pushing a button. In the case of a person with a physical injury or disability, the user may have difficulty in answering a phone or may be physically unable to respond to an incoming call. It has been realized that when a user's ability to answer a call is hindered by an activity or a disability, an improved method of answering a call is needed.

In the following, methods and systems are provided to automatically answer a call on a communication device. The user may be engaged in an activity such as driving a vehicle, jogging, or otherwise unable to manually answer the call. The system automatically answers the call for the user, obviating the need for the user to push a button or intervene in any other way to accept the incoming call. It will be appreciated that although the following examples are provided in the context of a mobile device, the principles discussed herein are equally applicable to other communication devices, for example conventional telephones or voice over IP telephones.

The following examples include communications between mobile or handheld devices, which will be referred to as mobile devices hereinafter and referred to by numeral 10.

The mobile device 10 can be a two-way communication device with advanced data communication capabilities including the capability to communicate with other mobile devices 10 or computer systems through a network of transceiver stations. The mobile device 10 may also have the capability to allow voice communication. Depending on the functionality provided by the mobile device 10, it may be referred to as a data messaging device, a two-way pager, a cellular telephone with data messaging capabilities, a wireless Internet appliance, or a data communication device (with or without telephony capabilities). The mobile device 10 can also be one that is used in a system that is configured for continuously routing all forms of pushed information from a host system 25 to the mobile device 10. One example of such a system will now be described making reference to FIG. 1.

FIG. 1 is an example system diagram showing the redirection of user data items (such as message A or C) from a corporate enterprise computer system (host system) 25 to the user's mobile device 10 via a wireless router 26. The wireless router 26 provides the wireless connectivity functionality as it acts to both abstract most of the wireless network's 20 complexities, and it also implements features necessary to support pushing data to the mobile device 10. Although not shown, a plurality of mobile devices may access data from the host system 25. In this example, message A in FIG. 1 represents an internal message sent from, e.g. a desktop computer (not shown) within the host system 25, to any number of server computers in the corporate network (e.g. LAN), which may, in general, include a database server, a calendar server, an E-mail server or a voice-mail server.

Message C in FIG. 1 represents an external message from a sender that is not directly connected to the host system 25, such as the user's mobile device 10, some other user's mobile device (not shown), or any user connected to the public or private network 24 (e.g. the Internet). Message C could be e-mail, voice-mail, calendar information, database updates, web-page updates or could even represent a command message from the user's mobile device 10 to the host system 25. The host system 25 may include, along with the typical communication links, hardware and software associated with a corporate enterprise computer network system, one or more wireless mobility agents, a TCP/IP connection, a collection of data stores, (for example a data store for e-mail could be an off-the-shelf mail server like Microsoft Exchange® Server or Lotus Notes® Server), all within and behind a corporate firewall.

The mobile device 10 may be adapted for communication within wireless network 20 via wireless links, as required by each wireless network 20 being used. As an illustrative example of the operation for a wireless router 26 shown in FIG. 1, consider a data item A, repackaged in outer envelope B (the packaged data item A now referred to as "data item (A)") and sent to the mobile device 10 from an Application Service Provider (ASP) in the host system 25. Within the ASP is a computer program, similar to a wireless mobility agent, running on any computer in the ASP's environment that is sending requested data items from a data store to a mobile device 10. The mobile-destined data item (A) is routed through the network 24, and through the wireless router's 26 firewall protecting the wireless router 26 (not shown).

Although the above describes the host system 25 as being used within a corporate enterprise network environment, this is just one example embodiment of one type of host service that offers push-based messages for a handheld wireless device that is capable of notifying and presenting the data to the user in real-time at the mobile device when data arrives at the host system.

By offering a wireless router 26 (sometimes referred to as a "relay", "message server", "data redirector", etc.), there are a number of major advantages to both the host system 25 and the wireless network 20. The host system 25 in general runs a host service that is considered to be any computer program that is running on one or more computer systems. The host service is said to be running on a host system 25, and one host system 25 can support any number of host services. A host service may or may not be aware of the fact that information is being channelled to mobile devices 10. For example an e-mail or message program 138 (see FIG. 2A) might be receiving and processing e-mail while an associated program (e.g. an e-mail wireless mobility agent) is also monitoring the mailbox for the user and forwarding or pushing the same e-mail to a wireless device 10. A host service might also be modified to prepared and exchange information with mobile devices 10 via the wireless router 26, like customer relationship management software. In a third example, there might be a common access to a range of host services. For example a mobility agent might offer a Wireless Access Protocol (WAP) connection to several databases.

Although the system is exemplified as operating in a two-way communications mode, certain aspects of the system could be used in a "one and one-half" or acknowledgment paging environment, or even with a one-way paging system. In such limited data messaging environments, the wireless router 26 still could abstract the mobile device 10 and wireless network 20, offer push services to standard web-based server systems and allow a host service in a host system 25 to reach the mobile device 10 in many countries.

The host system 25 shown herein can have many methods when establishing a communication link to the wireless router 26. For one skilled in the art of data communications the host system 25 could use connection protocols like TCP/IP, X.25, Frame Relay, ISDN, ATM or many other protocols to establish a point-to-point connection. Over this connection there are several tunnelling methods available to package and send the data, some of these include: HTTP/HTML, HTTP/XML, HTTP/Proprietary, FTP, SMTP or some other proprietary data exchange protocol. The type of host systems 25 that might employ the wireless router 26 to perform push could include: field service applications, e-mail services, stock quote services, banking services, stock trading services, field sales applications, advertising messages and many others. This wireless network 20 abstraction is made possible by the wireless router 26, which implements this routing and push functionality. The type of user-selected data items being exchanged by the host could include: E-mail messages, calendar events, meeting notifications, address entries, journal entries, personal alerts, alarms, warnings, stock quotes, news bulletins, bank account transactions, field service updates, stock trades, heart-monitoring information, vending machine stock levels, meter reading data, GPS data, etc., but could, alternatively, include any other type of message that is transmitted to the host system 25, or that the host system 25 acquires through the use of intelligent agents, such as data that is received after the host system 25 initiates a search of a database or a website or a bulletin board.

The wireless router 26 provides a range of services to make creating a push-based host service possible. These networks may include: (1) the Code Division Multiple Access (CDMA) network, (2) the Groupe Special Mobile or the Global System for Mobile Communications (GSM) and the General Packet Radio Service (GPRS), and (3) the existing and upcoming third-generation (3G) and fourth generation (4G) networks like EDGE, UMTS and HSDPA, LTE, Wi-Max etc. Some older examples of data-centric networks include, but are not limited to: (1) the Mobitex Radio Network ("Mobitex") and (2) the DataTAC Radio Network ("DataTAC").

To be effective in providing push services for host systems 25, the wireless router 26 may implement a set of defined functions. It can be appreciated that one could select many different hardware configurations for the wireless router 26; however, many of the same or similar set of features would likely be present in the different configurations.

Figure 2A:
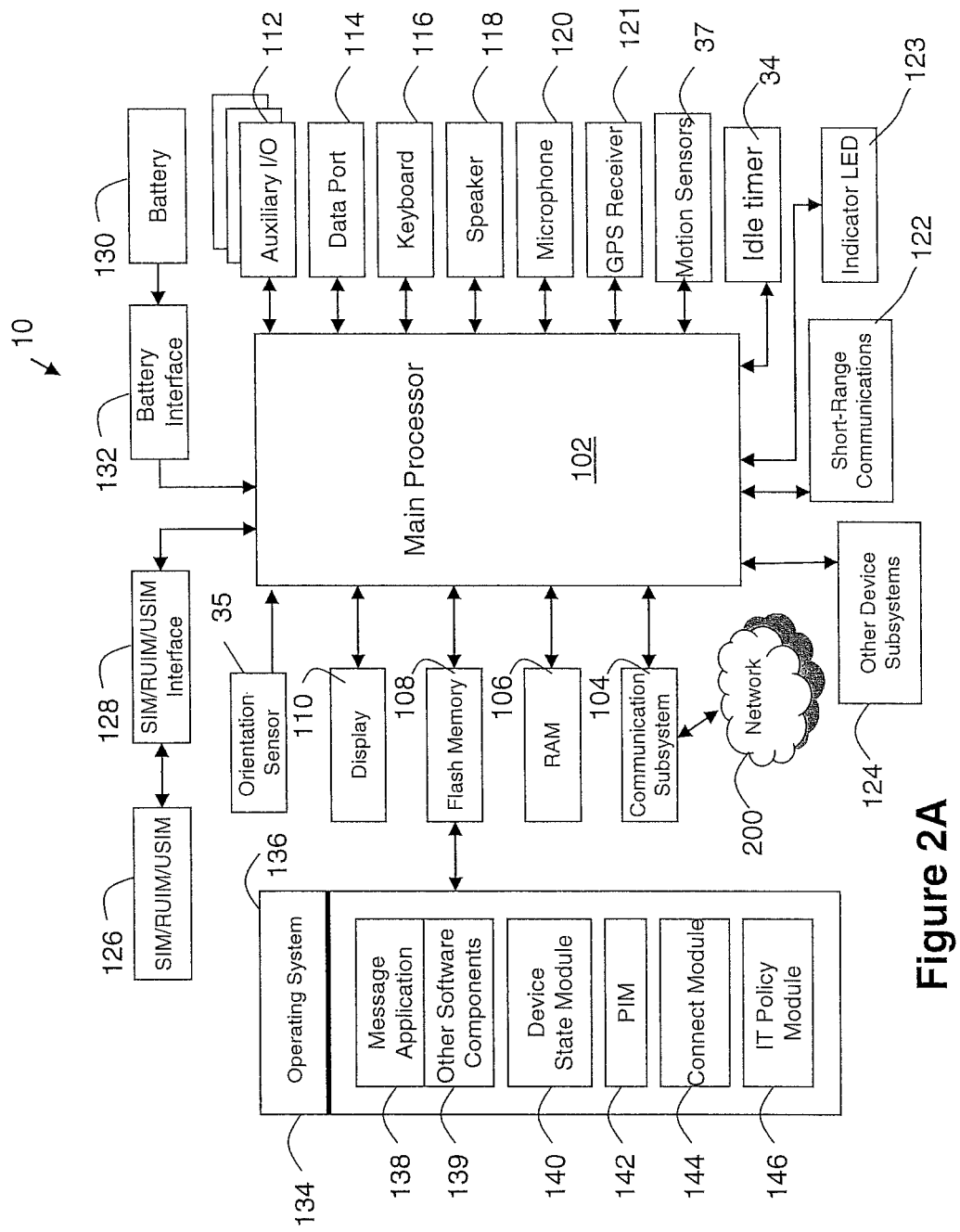
FIG. 2A is a block diagram of an example embodiment of a mobile device.
Figure 3:
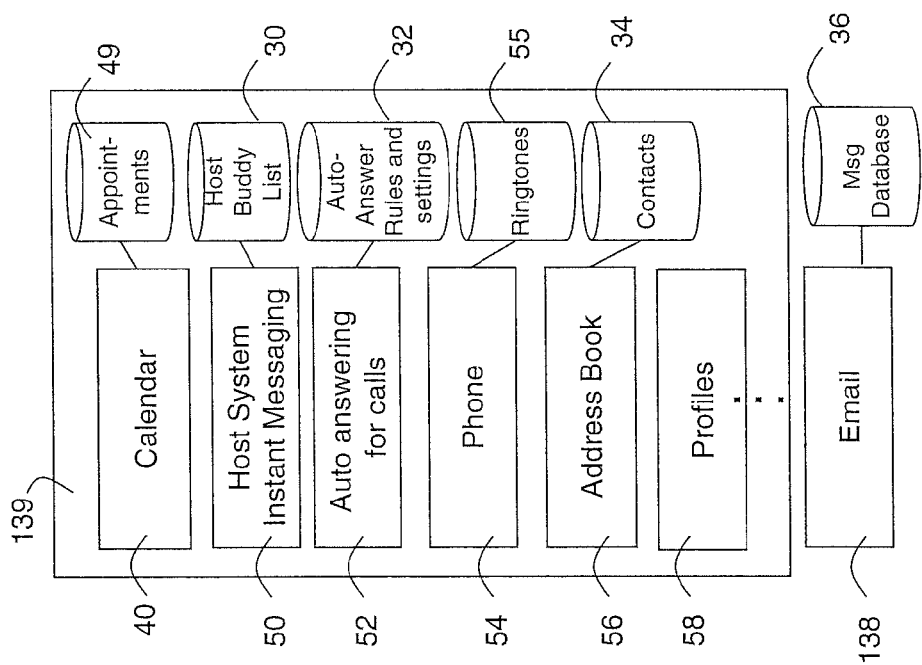
FIG. 3 is a block diagram illustrating examples of the other software applications and components shown in FIG. 2A.

An example configuration for the mobile device 10 is illustrated in FIGS. 2A and 3. Referring first to FIG. 2A, shown therein is a block diagram of an example embodiment of a mobile device 10. The mobile device 10 includes a number of components such as a main processor 102 that controls the overall operation of the mobile device 10. Communication functions, including data and voice communications, are performed through a communication subsystem 104. The communication subsystem 104 receives messages from and sends messages to a wireless network 20. In this example embodiment of the mobile device 10, the communication subsystem 104 is configured in accordance with the GSM and GPRS standards, which are used worldwide. Other communication configurations that are equally applicable are the 3G and 4G networks discussed above. New standards are still being defined, but it is believed that they will have similarities to the network behaviour described herein, and it will also be understood by persons skilled in the art that the example embodiments described herein are intended to use any other suitable standards that are developed in the future. The wireless link connecting the communication subsystem 104 with the wireless network 20 represents one or more different Radio Frequency (RF) channels, operating according to defined protocols specified for GSM/GPRS communications.

The main processor 102 also interacts with additional subsystems such as a Random Access Memory (RAM) 106, a flash memory 108, a display 110, an auxiliary input/output (I/O) subsystem 112, a data port 114, a keyboard 116, an accelerometer 117, a gyroscope 119, a speaker 118, a microphone 120, a GPS receiver 121, short-range communications 122, an indicator light 123, and other device subsystems 124.

As will be discussed below, the short-range communications 122 can implement any suitable or desirable device-to-device or peer-to-peer communications protocol capable of communicating at a relatively short range, e.g. directly from one device to another. Examples include Bluetooth®, ad-hoc WiFi, infrared, or any "long-range" protocol re-configured to utilize available short-range components. It will therefore be appreciated that short-range communications 122 may represent any hardware, software or combination of both that enable a communication protocol to be implemented between devices or entities in a short range scenario, such protocol being standard or proprietary.

Some of the subsystems of the mobile device 10 perform communication-related functions, whereas other subsystems may provide "resident" or on-device functions. By way of example, the display 110 and the keyboard 116 may be used for both communication-related functions, such as entering a text message for transmission over the network 20, and device-resident functions such as a calculator or task list.

The mobile device 10 can send and receive communication signals over the wireless network 20 after required network registration or activation procedures have been completed. Network access is associated with a subscriber or user of the mobile device 10. To identify a subscriber, the mobile device 10 may use a subscriber module component or "smart card" 126, such as a Subscriber Identity Module (SIM), a Removable User Identity Module (RUIM) and a Universal Subscriber Identity Module (USIM). In the example shown, a SIM/RUIM/USIM 126 is to be inserted into a SIM/RUIM/USIM interface 128 in order to communicate with a network. Without the component 126, the mobile device 10 is not fully operational for communication with the wireless network 20. Once the SIM/RUIM/USIM 126 is inserted into the SIM/RUIM/USIM interface 128, it is coupled to the main processor 102.

The mobile device 10 is typically a battery-powered device and in this example includes a battery interface 132 for receiving one or more rechargeable batteries 130. In at least some example embodiments, the battery 130 can be a smart battery with an embedded microprocessor. The battery interface 132 is coupled to a regulator (not shown), which assists the battery 130 in providing power V+ to the mobile device 10. Although current technology makes use of a battery, future technologies such as micro fuel cells may provide the power to the mobile device 10.

The mobile device 10 also includes an operating system 134 and software components 136 to 146 which are described in more detail below. The operating system 134 and the software components 136 to 146 that are executed by the main processor 102 are typically stored in a persistent store such as the flash memory 108, which may alternatively be a read-only memory (ROM) or similar storage element (not shown). Those skilled in the art will appreciate that portions of the operating system 134 and the software components 136 to 146, such as specific device applications, or parts thereof, may be temporarily loaded into a volatile store such as the RAM 106. Other software components can also be included, as is well known to those skilled in the art.

The subset of software applications 136 that control basic device operations, including data and voice communication applications, may be installed on the mobile device 10 during its manufacture. Software applications may include a message application 138, a device state module 140, a Personal Information Manager (PIM) 142, a connect module 144 and an IT policy module 146. A message application 138 can be any suitable software program that allows a user of the mobile device 10 to send and receive electronic messages, wherein messages are typically stored in the flash memory 108 of the mobile device 10. A device state module 140 provides persistence, i.e. the device state module 140 ensures that important device data is stored in persistent memory, such as the flash memory 108, so that the data is not lost when the mobile device 10 is turned off or loses power. A PIM 142 includes functionality for organizing and managing data items of interest to the user, such as, but not limited to, e-mail, text messages, instant messages, contacts, calendar events, and voice mails, and may interact with the wireless network 20. A connect module 144 implements the communication protocols that are required for the mobile device 10 to communicate with the wireless infrastructure and any host system 25, such as an enterprise system, that the mobile device 10 is authorized to interface with. An IT policy module 146 receives IT policy data that encodes the IT policy, and may be responsible for organizing and securing rules such as the "Set Maximum Password Attempts" IT policy.

Other types of software applications or components 139 can also be installed on the mobile device 10. These software applications 139 can be pre-installed applications (i.e. other than message application 138) or third party applications, which are added after the manufacture of the mobile device 10. Examples of third party applications include games, calculators, utilities, etc. The additional applications 139 can be loaded onto the mobile device 10 through at least one of the wireless network 20, the auxiliary I/O subsystem 112, the data port 114, the short-range communications subsystem 122, or any other suitable device subsystem 124.

The data port 114 can be any suitable port that enables data communication between the mobile device 10 and another computing device. The data port 114 can be a serial or a parallel port. In some instances, the data port 114 can be a USB port that includes data lines for data transfer and a supply line that can provide a charging current to charge the battery 130 of the mobile device 10.

For voice communications, received signals are output to the speaker 118, and signals for transmission are generated by the microphone 120. Although voice or audio signal output is accomplished primarily through the speaker 118, the display 110 can also be used to provide additional information such as the identity of a calling party, duration of a voice call, or other voice call related information.

The main processor 102 can also control a backlight 36 for conserving battery life when the mobile device 10 is locked or otherwise not in use (e.g. in a holster). The backlight 36 can be used to illuminate the display 110 when the mobile device 10 is being used. The backlight 36 can be associated with an idle timer 34 such that an idle time can be tracked and if it reaches or exceeds a certain predetermined threshold (or user definable threshold), the backlight 36 is turned off. As will be explained below, the idle timer 34 can also be used to provide a current idle time to the main processor 102 for other uses such as to determine inactivity of the user. The main processor 102 may also utilize data provided by a motion sensor such as an accelerometer, magnetometer or gyroscope.

For composing data items, such as e-mail messages, for example, a user or subscriber could use a touch-sensitive overlay (not shown) on the display 110 that is part of a touch screen display (not shown), in addition to possibly the auxiliary I/O subsystem 112. The auxiliary I/O subsystem 112 may include devices such as: a mouse, track ball, infrared fingerprint detector, or a roller wheel with dynamic button pressing capability. A composed item may be transmitted over the wireless network 20 through the communication subsystem 104.

Figure 2B:
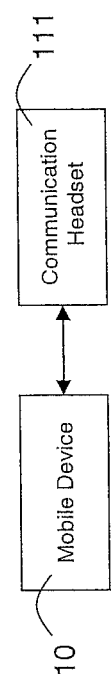
FIG. 2B is a block diagram of an example communication headset in communication with a mobile device.

FIG. 2B shows the mobile device 10 of FIG. 2A in communication with a communication headset 11. The communication headset 11 is worn by the user and includes a microphone and a speaker. Typically, the headset 11 can be worn in order to avoid having to hold the mobile device 10 adjacent to the user's ear. When in communication with the mobile device 10, the communication headset 11 serves to replace the microphone 120 and speaker 118 of the mobile device 10.

FIG. 3 shows an example of the other software applications and components 139 that may be stored on and used with the mobile device 10. Only examples are shown in FIG. 3 and such examples are not to be considered exhaustive. In this example, a calendar application 40, instant message application 50, an automatic call answering application 52, a phone application 54, an address book 56 and a profiles application 58 are shown to illustrate the various features that may be provided by the mobile device 10. These applications can access information stored on the mobile device, e.g. appointments 49, host buddy list 30, auto-answer rules and settings 32, ringtones 55, and contacts 34. Also shown in FIG. 3 is the message application 138, which in the following will be referred to as an email application 138 for clarity and stores or otherwise has access to a message database 36 for storing incoming and outgoing messages as well as those stored in various folders. It will be appreciated that the various applications may operate independently or may utilize features of other applications. For example, the phone application 54 and email application 138 may use the address book 56 for contact details obtained from a list of contacts 34.

Other example software applications and components include the automatic answering for call application 52 (also referred to as the auto-answer application 52), which can be used with the phone application 54 and other applications (e.g. address book 56, profiles 58 and calendar 48). For example, the auto-answer 52 can access the calendar appointments 49, the phone's ringtones 55, or the address book's contacts 34. Such information can be used to activate certain auto-answer rules and settings 32 associated with the auto-answer application 52.

It will be appreciated that any application or module exemplified herein may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data, except transitory propagating signals per se. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the mobile device 10 or any other communication device, or accessible or connectable thereto. Any application or module herein described may be implemented using computer readable/executable instructions that may be stored or otherwise held by such computer readable media.

Figure 4:
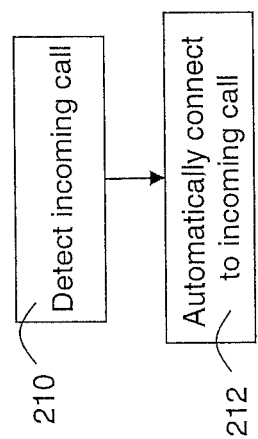
FIG. 4 is a flow diagram illustrating example computer executable instructions for automatically answering a phone call.

FIG. 4 illustrates a method flow diagram of the mobile device 10 automatically answering a call. An incoming call to the mobile device 10 is first detected 210 by the phone application 54. The auto-answer feature in the phone application 54 then automatically answers the call 212, putting the recipient of the call (e.g. the user of the mobile device 10) in communication with the caller. In other words, the user does not need to perform any action for the mobile device 10 to automatically answer the call.

Figure 5:
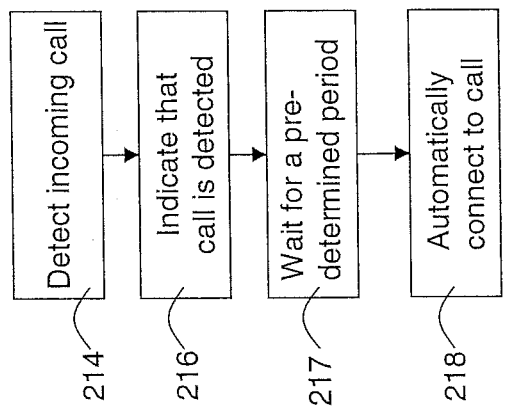
FIG. 5 is a flow diagram similar to FIG. 4 illustrating example computer executable instructions for automatically answering a phone call after a pre-determined period of time upon detecting the call.

Referring to FIG. 5, it is often useful for the user to be provided with a period of time to prepare for answering the call. Here, the mobile device 10 detects the call 214 then provides an indication that it has detected an incoming call 216. Indications, as disclosed herein, can include for example a physical indication (such as a vibration through a vibration mechanism of mobile device 10), an audible indication (such as a ringtone, chirp or beep) through speaker 118 of mobile device 10, a visual indication (such as a flash of indicator LED 123 of mobile device 10 or a flash of indicator LED 123 in a predetermined colour, or a message such as "incoming call", "auto-answer enabled" or "auto-answer disabled" displayed on display 110 of mobile device 10, or any combination, repetition or pattern of these indications). Once the device 10 provides an indication that an incoming call is detected 216, the device 10 waits for a period of time 217 to provide the user with an opportunity to prepare for the call. For instance, the user may wish to use this time to reduce the ambient noise in preparation for the call. The indication 216 may also be provided continuously or repetitively throughout the waiting period 217 until the call is automatically answered 218. It will be appreciate that the pre-determined period of time could be measured in seconds or be characterized by a number of ringtones. Providing the recipient with an indication or warning that a call has been detected could serve to capture the recipient's attention from his other activities or conversations and allow him to prepare to answer.

It is recognized that if the mobile device 10 is left unattended or if the user is not aware that the device has received a call, the automatic answering of a call presents a problem. If the mobile device 10 is automatically answered without the presence of the recipient, the caller may be confused or the device could be left in conversation until the remote party ends the conversation. Furthermore, should the recipient of the call fail to realize that the device has auto answered a call, a conversation or other private sounds could be heard by the remote device without the recipient's knowledge. Additionally, a user may use the auto-answer feature to eavesdrop. For example, a user can place their mobile device 10 in a room and later on call the mobile device 10 (which will be automatically answered) to listen in on a phone conversation in the room.

Figure 6:
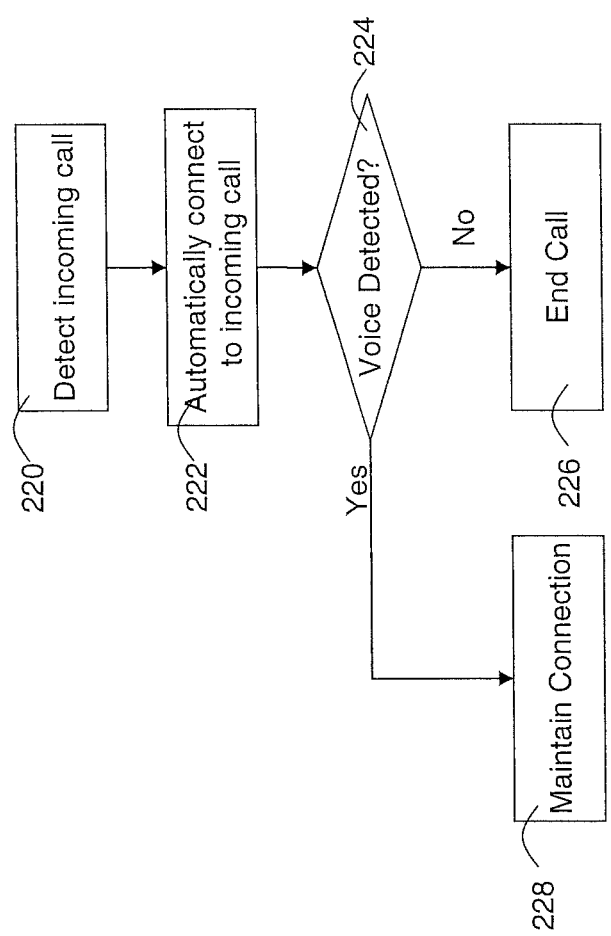
FIG. 6 is a flow diagram illustrating example computer executable instructions for a communication device showing the method for ending a call upon not detecting a voice.

Turning to FIG. 6, example computer executable instructions are provided to mitigate these effects. Similar to FIG. 4, the call is detected 220 then automatically connected 222. However, another step 224 is provided whereby the mobile device 10 determines whether the microphone 120 detects sound on the recipient's mobile device 10. If the mobile device 10 detects sound, the connection is maintained 228. If the device detects no sound over the microphone 120, for example, over a pre-determined period of time, the call is ended 226. The mobile device 10 may analyze the sound to determine whether it was made by a human voice or corresponds to a sound level (e.g. measured in decibels) or both. For example, the sound level threshold is determined by an expected sound level consistent with talking in proximity to the microphone 120. The analysis of the sound is used to determine if a conversation is occurring away from the mobile device 10, and, if so, ending or disconnecting the call. By way of example, the analysis of sound to determine whether voice, and not merely background noise, is present can be achieved using a band pass filter which determines whether the sounds are within the 80 Hz to 8000 Hz that is typical of the human voice, be above a certain threshold in amplitude, and have a duration of greater than a few hundred milliseconds. Other algorithms that detect human voice could also be used.

Figure 7:
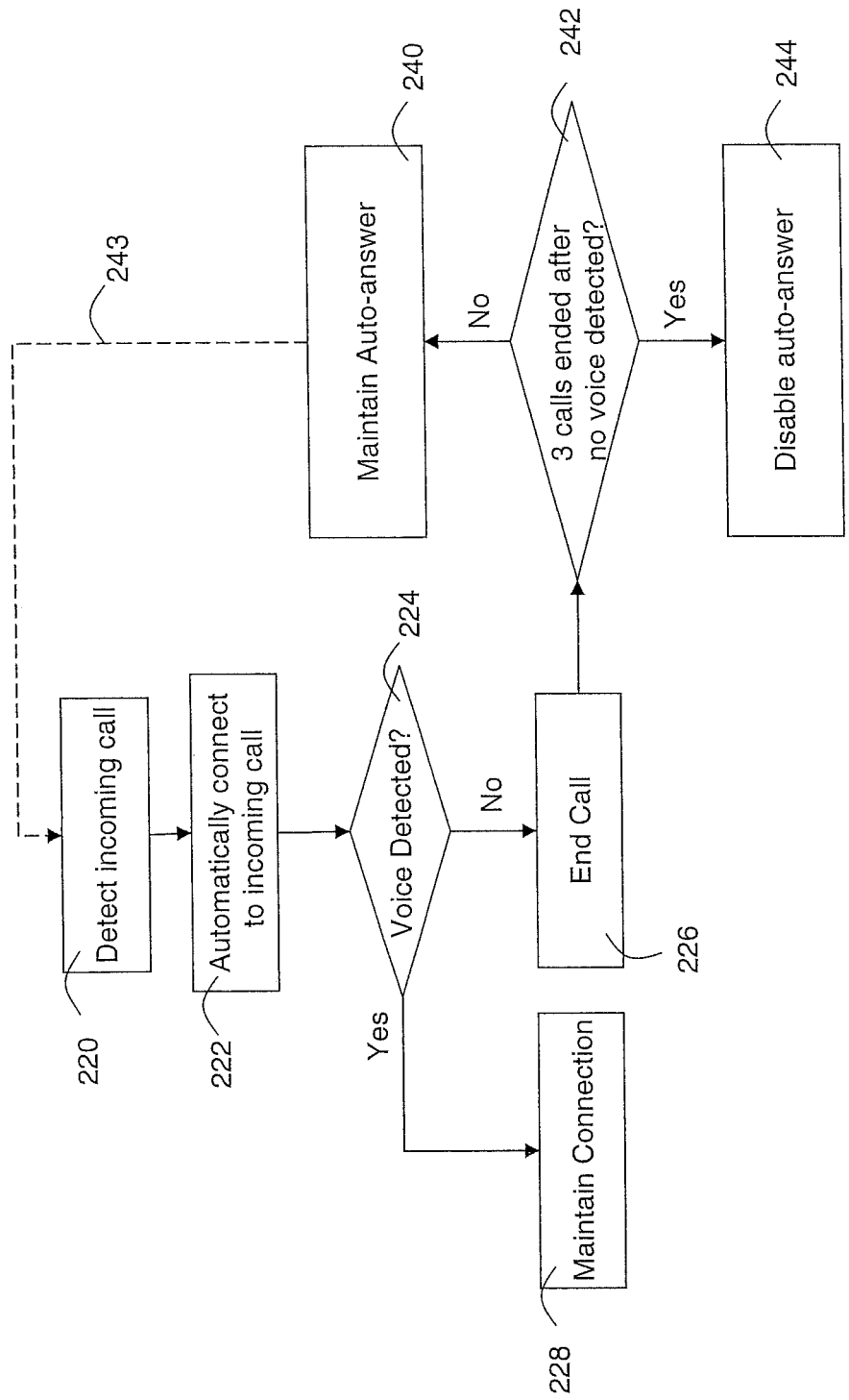
FIG. 7 is the flow diagram of FIG. 6 further illustrating example computer executable instructions for disabling the automatic answering feature upon ending a pre-determined number of calls.

Referring now to FIG. 7, which includes certain features of those shown in FIG. 6, a further method to disable the automatic answering feature is provided. In this method, if the connection is established then ended according to the method of FIG. 6, the mobile device 10 would count this as an automatically ended call. If a pre-determined number of automatically ended calls are counted 242, for example three calls, the automatic answering feature is disabled 244. This prevents the device 10 from answering a large number of calls in the user's absence and instead enables future calls to go to voicemail. This can reduce the frustration of the callers, reduce the depletion in the user's battery from connecting calls without the recipient being present and allow the callers to leave voicemail instead of a missed call. Further, this can also be used to prevent the mobile device 10 from repeatedly establishing a connection with a caller, thereby reducing the risk that the caller may overhear elements of a conversation or other personal sounds.

Continuing to FIG. 7, if the number of consecutive ended calls is less than the predetermined threshold number, then the auto-answering feature is maintained 240. Therefore, as shown by dotted line 243, should there be future incoming calls detected 220 the mobile device 10 will automatically connect to the incoming call 222.

It can be appreciated that the disabling of the automatic answering feature as shown in FIG. 7 may also be contact specific and such as for example may disable the automatic answering feature for particular contacts. For example, if an incoming call from Contact A is detected, the call is automatically connected, and then the call is automatically disconnected (e.g. because sound or voice was not detected in the microphone 120), then the mobile device 10 could disable the automatic answering feature for contact A specifically but allow the auto-answer feature to remain enabled for other contacts. The same principles may be applied to a group of contacts, for instance, unknown callers.

In another example embodiment, if the call is automatically disconnected or if the auto-answer feature is enabled or disabled, a user's presence status can be automatically modified accordingly. By way of example, the presence status of an instant messaging system 50 could be changed from "available" to "away" when the call is automatically disconnected.

After the automatic answering feature has been disabled because no voice was detected after answering a pre-determined number of incoming calls, the mobile device 10 could provide an indication to the user using the display 110 that the automatic answering feature is no longer enabled (e.g. displaying "3 Auto-answered calls disconnected. Auto-answer disabled"). This indication may also include an option to re-enable the automatic answering feature as a way to prompt the user to re-enable the automatic answering feature (e.g. displaying "3 Auto-answered calls disconnected. Auto-answer disabled. Click here to re-enable."). In the case where the mobile device 10 disables the automatic answering feature for a particular contact or a group of contacts, the indication and option to re-enable the automatic answering feature would apply to just the contacts affected. By way of example, if the automatic answering feature was disabled, the indication could include a button on the display 110 that re-enables the automatic answering feature once selected by the user.

Figure 8:
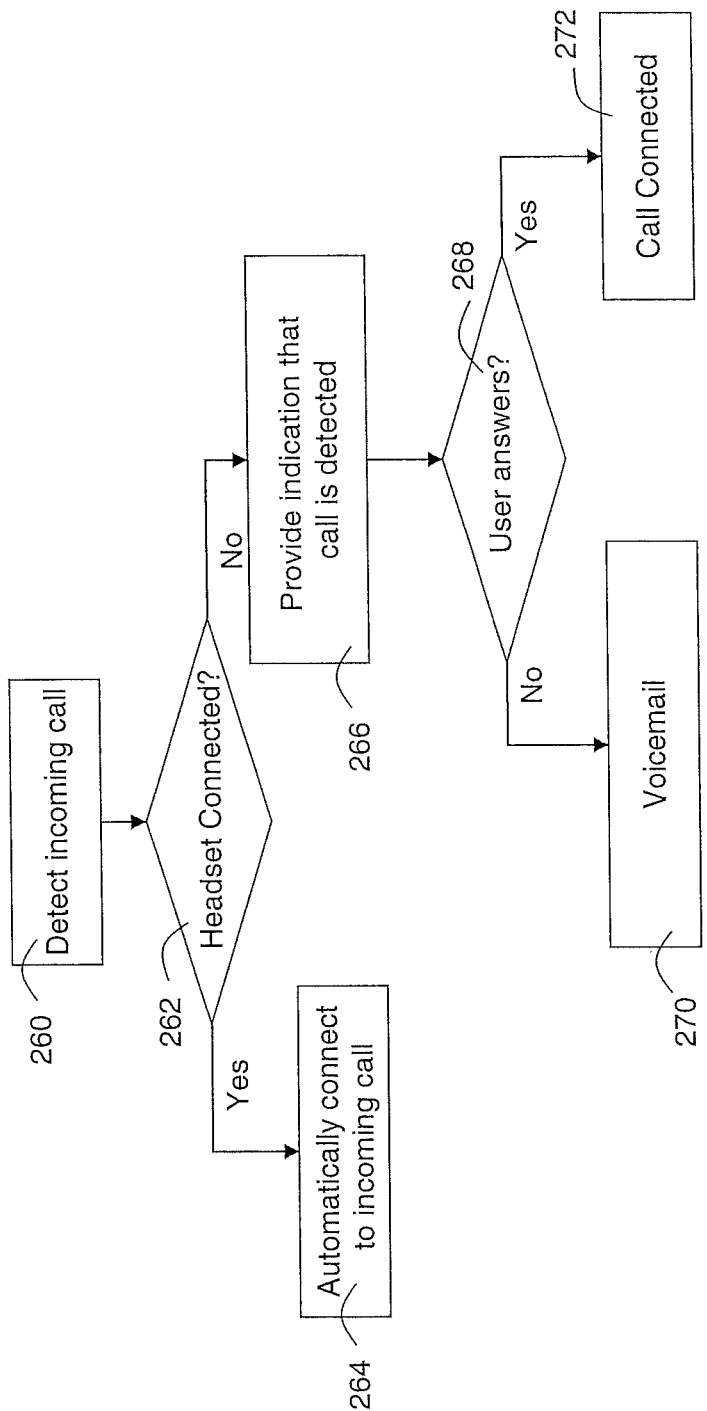
FIG. 8 is a flow diagram illustrating example computer executable instructions for automatically answering a call only if a communications headset is in communication with a communications device.

In some circumstances, it may be useful to answer calls only when a hands-free communications headset 11 or an in-vehicle speakerphone is connected to the mobile device 10. FIG. 8 shows a method whereby a call is automatically answered only if the mobile device 10 detects a connected headset 11. The mobile device 10 detects an incoming call 260, then determines whether a communications headset 11 is connected 262. If a headset 11 is connected, the call is automatically connected 264. Conversely, if no headset 11 is detected, the mobile device 10 requires user input before connecting the call. For example, the device 10 provides an indication that the call is detected 266, then determines whether the user manually answers the call 268. If the user answers the call, the call is connected 272. If the user does not answer the call, the call is not connected and may be sent to voicemail 270. It can be appreciated that the headset 11 may be connected by several means including through a wired connection, a wireless connection such as Bluetooth™ or another means. A popular type of headset 11 is the Bluetooth headset. The method of FIG. 8 can be used to reduce the number of calls that are automatically answered when the recipient is not present, as the recipient is typically present when a Bluetooth device or an in-vehicle speakerphone, or both are enabled. In some instances, this may also prevent other users from hearing the incoming portion of the conversation and affords the members of the conversation some measure of privacy. Further, in the case of the communications headset 11, the feature of FIG. 6 that automatically maintains a connection for a call upon detecting a sound will be less likely to be activated from ambient noise. In other words, if there is ambient noise, such noise will less likely be detected by a headset 11.

For users who are able to answer calls in a conventional manner in some settings but would rather that the mobile device 10 automatically answer calls in other situations, an option is provided to selectively enable the automatic answering feature. Turning to FIG. 9, examples of different settings or rules under which a call is automatically answered are provided in the "In-call settings" screen 246. Options for when to automatically answer calls are provided on a drop-down list. These options include "Never" 250, "Out of Holster" 252, "Slide Open" 254, and "Both" 256. The "Never" option 250 is a method including detecting an incoming call and upon detection of the call, not automatically answering the call. The "Out of Holster" option 252 includes detecting an incoming call, determining if the device 10 is in the holster and, if not, automatically answering the incoming call. It can be appreciated a holster holds the mobile device 10, and the mobile device has sensors (e.g. electro-magnetic sensors) for detecting whether it is in the holster or not. Another option may also be provided to automatically answer a call when the device is in the holster. This option would include detecting an incoming call, detecting whether the device 10 is in the holster and, if so, automatically answering the incoming call. The "Slide Open" option 254, applicable to mobile devices that can slide between an open and closed state, may include detecting an incoming call, determining whether the device 10 is slid open and if so, automatically answering the call. The "Slide Open" option 254 may also include detecting an incoming call, indicating to the user that an incoming call has been detected, waiting for a pre-determined period of time, during which the call is answered if the device 10 is slid open by the user. The options further include the "Both" option 256, which, by way of example, may include detecting an incoming call, determining whether the device 10 is in the holster and determining whether the device 10 is slid open, and if both conditions are met, automatically answering the call. In another example embodiment of the "Both" option 256, it also includes determining whether the device 10 is in the holster and determining whether the device 10 is slid open and, if the device 10 is not in the holster and not slid open, automatically answering the incoming call. The options on the drop-down list 258 also include the "Auto Answer Calls" setting which programs the mobile device 10 to automatically answer the call "After 5 seconds (Bluetooth™/Headset Only)".

FIG. 10 shows the "Auto Answer Calls" setting 248 with "After 5 seconds (Bluetooth™/Headset Only)" 258 selected by the user. With this option enabled, the mobile device 10 will detect a call and indicate to the user that the call has been detected. In the example option selected in FIG. 9 and FIG. 10, the mobile device 10 detects a call, detects whether a communication headset 11 is connected and if so, alerts the user via an indication for a period of about five seconds then automatically connects the call. If no communication headset 11 is connected, the mobile device 10 may still alert the user but require confirmation from the call recipient before making the connection.

Figure 11:
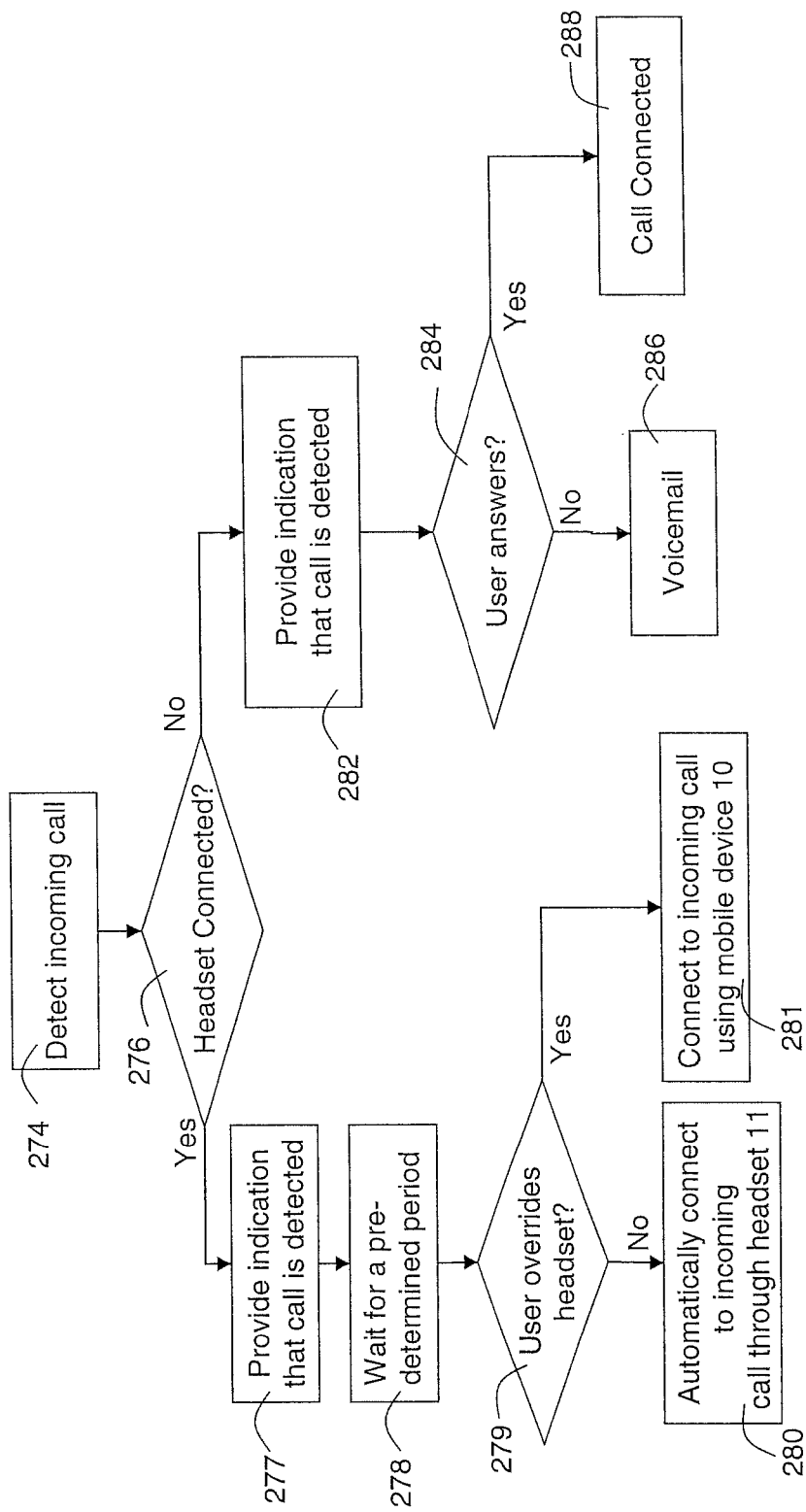
FIG. 11 is a flow diagram illustrating example computer executable instructions for overriding the use of a communications headset, which is in communication with a mobile device, upon receiving an incoming call.

Turning to FIG. 11, it may be useful to provide the user with the option of overriding the use of a communications headset 11 that is in communication with the mobile device 10. If the user is unable to reach the communication headset 11 during an incoming call, the user may opt to communicate using mobile device 10 (e.g. using speaker 118 and microphone 120). For instance, a user who has dropped a Bluetooth™ communication headset 11 between the seats of a vehicle and is unable to reach the headset 11 in time to receive the incoming call may activate a button on the display 110 or on the keyboard 116 of the mobile device 10 to route the call through the speaker 118 and microphone 120 in lieu of the headset 11.

In the method of FIG. 11, the mobile device 10 first detects a call 274 then determines whether a headset 11 is connected 276. If the headset 11 is connected, the mobile device 10 indicates to the user (by a physical, audible and/or visual indication) that the call has been detected 277 and waits for a pre-determined period of time 278. During this time, the user is provided with an option 279 to override the use of the headset 11. The user may also be provided with a ringtone. If, during this time, the user overrides the use of the headset 11 (e.g. through a button on the display 110 or on the keyboard 116), the mobile device 10 will abandon the use of the headset 11 for the duration of the call and communicate directly through the device 10 (e.g. through the speaker 118 and microphone 120) 281. Conversely, if the user does not respond during this pre-determined period of time, the call is connected 280 through the headset 11. If, after detecting the incoming call, the mobile device 10 determines that the headset 11 is not connected, the device 10 can proceed with the manual procedure for answering a call, which provides the user with an indication 282 (which may be a physical, audible and/or visual indication) and requires user intervention between detection of the call and connection of the call. In this case, if the headset 11 is disconnected, the mobile device 10 indicates to the user that there is an incoming call 282. The device 10 determines whether the user has manually intervened to answer the call 284 and, if so, connects the call 288. In the absence of user intervention, the incoming call is not connected and may be sent to voicemail 286.

It may be desirable to provide the recipient with an indication that the automatic answering system is engaged once the mobile device 10 receives the call. For example, this indication could be provided immediately after the mobile device 10 detects a call and before a ringtone is played. The indication would inform the recipient that a call is incoming and that the automatic answering feature will answer the call, obviating the need for the recipient to intervene should he wish to be placed in contact with the caller.

Figures 12, 13:
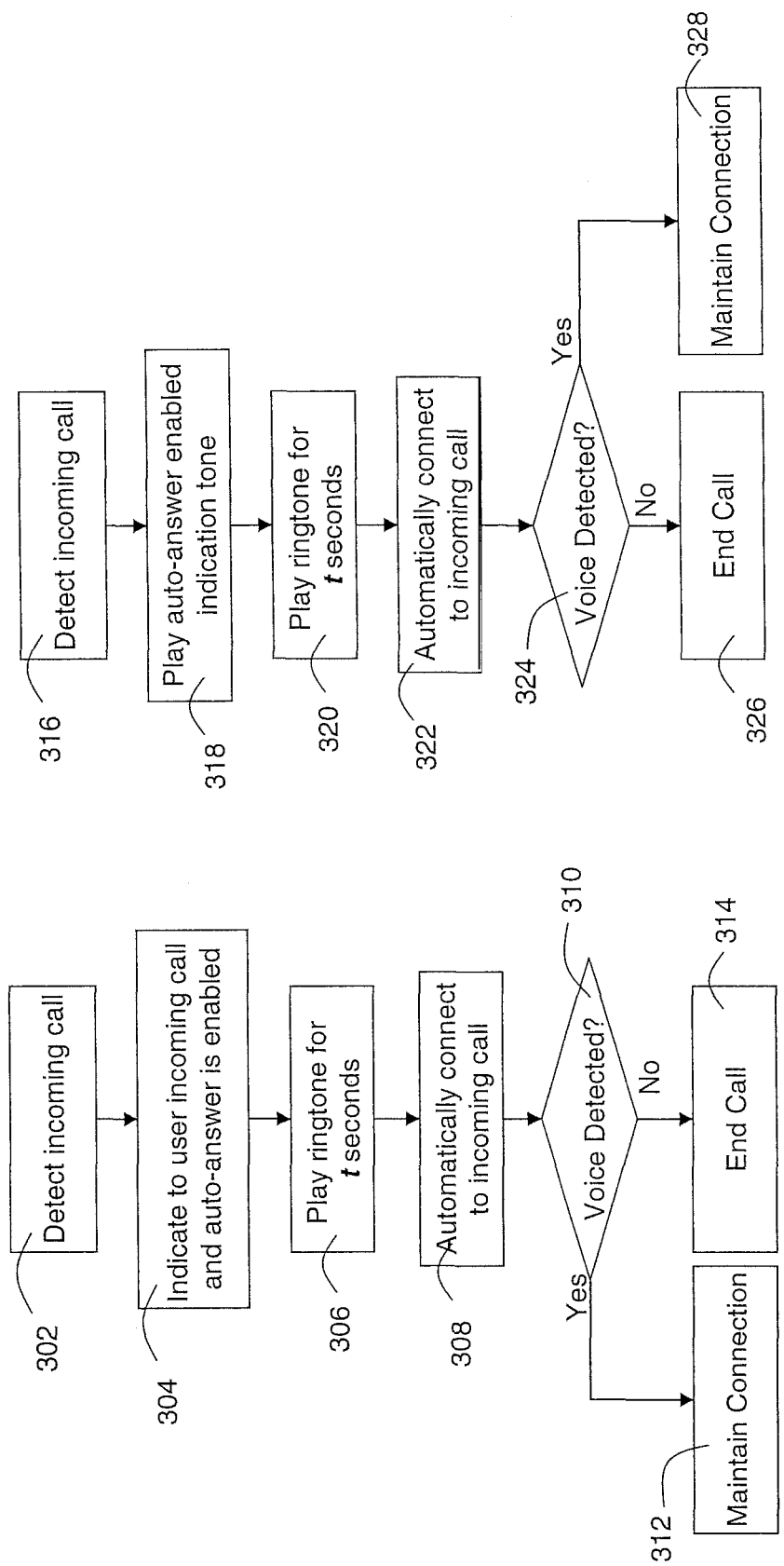
FIG. 12 is a flow diagram illustrating example computer executable instructions for automatically answering a call that provides an indication to the user that an incoming call has been detected and the automatic answering feature is enabled.
FIG. 13 is the flow diagram illustrating example computer executable instructions of FIG. 12 wherein the indication is an audible tone.

FIG. 12 is a representation of a method of automatically answering a call. Once the call is detected 302, an indication is provided to inform the user (in the form of a physical, audible and/or visual indication) that a call has been detected and that the automatic answering feature is enabled 304, providing the recipient with a period of time 306 between the detection of the call 302 and the automatic connection of the call 308. The time allows a period in which the user can move near to the mobile device 10 if the device 10 is not nearby the user. Once the call is connected, the mobile device 10 monitors recipient's side for sound (e.g. using microphone 120), or specific sounds such as voice, to determine whether the user is present on the call 310. If a sound signal is not detected over a pre-determined amount of time, the call is ended 314. Otherwise, if the sound is detected, the connection is maintained 312.

The indication at 304 of FIG. 12 can include a distinct audible indication prior to initiating the ringtone, as best seen in FIG. 13. Similarly to FIG. 12, the call is detected 316, an audible indication is provided to inform the user that the call has been detected and the auto-answer feature is engaged 318. The audible indication may include any sound that is different from the ringtone, for instance a chirp or a beep. The ringtone is then played for a pre-determined period of time 320 then the call is automatically answered 322. It is then determined if a specific sound such as voice is detected over the microphone 120 (324). If so, the connection is maintained 328, otherwise, the call is ended 326.

In an example embodiment, the indication includes a visual indication that is provided concurrently with the ringtone. In another example embodiment, the indication includes a ringtone that distinctly indicates that the auto-answer feature is enabled or disabled, and such ringtone indicator is distinct from the conventional ringtone that plays when an incoming call is detected. The indication could also include a vibration or a visual indication via means other than the display 110, such as the indicator light 123. The indicator light 123 could be illuminated in a different colour or be illuminated solidly or intermittently to differentiate the indication from a typical indication of when the automatic answering feature is disabled.

Figure 14:
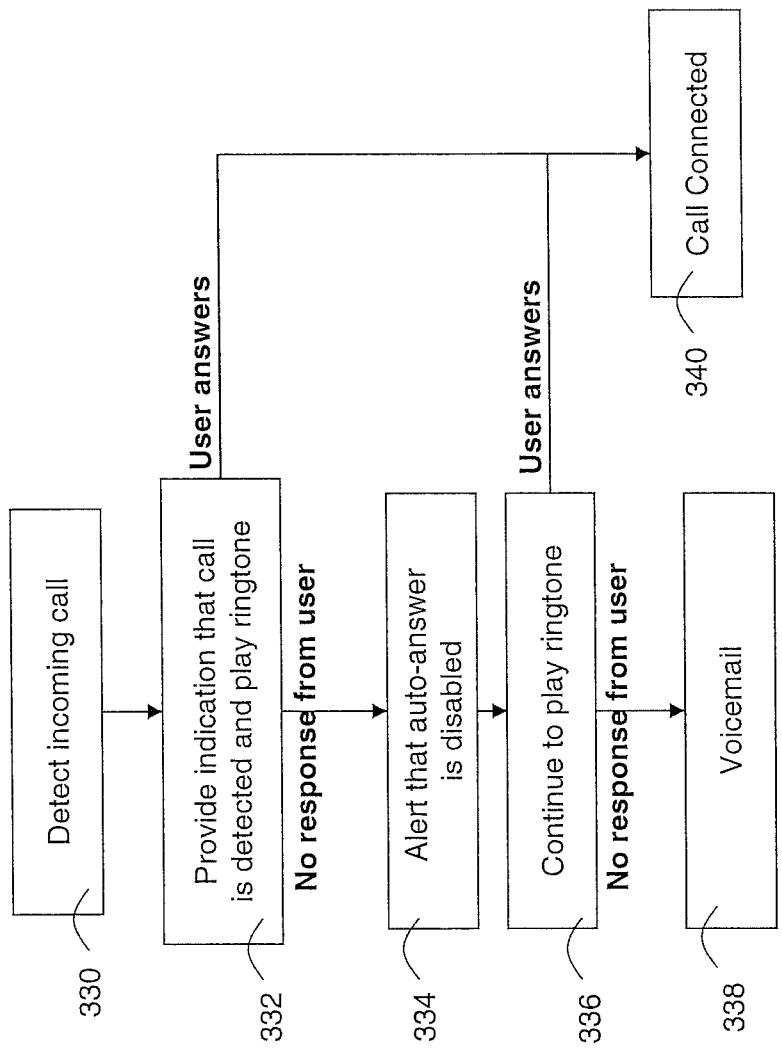
FIG. 14 is a flow diagram illustrating example computer executable instructions for notifying the user after an incoming call is detected that the auto-answer feature is not enabled.

The presence of the automatic call answering feature raises new issues with respect to a user knowing whether manual intervention is required for the call to be connected. For instance, if a user is unaware of the status of the setting, the user may expect the automatic answering feature to connect the call and consequently, the user could miss the call. To address this, an example method is proposed in FIG. 14 that alerts a user that a call has been detected, but the automatic answering feature is not enabled. Once the incoming call is detected 330, the mobile device 10 provides the user with an indication that the call has been detected 332. If the user has not responded to the indication that a call is incoming, the mobile device 10 provides an alert that the automatic answering feature is not enabled and that user intervention is required to connect the call 334. The ringtone continues 336 and with a traditional telephone call, if the user does not intervene during the ringing period, the call will be missed and the call is forwarded to voicemail 338. If the user manually intervenes to answer the incoming call, the call is connected 340. The alert that the automatic answering feature is not enabled could include any indication that is distinct from the indication given to notify a user that the automatic answering feature is enabled.

Figure 16:
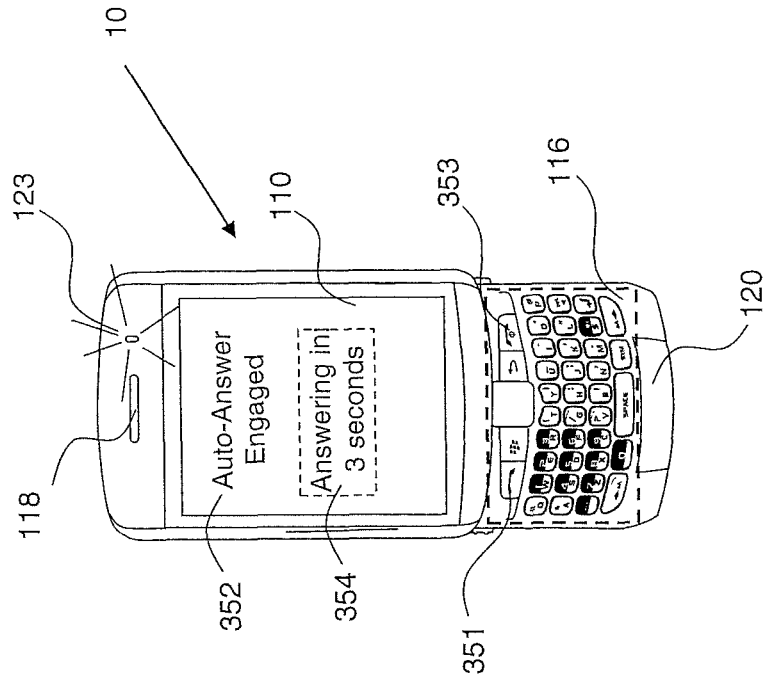
FIG. 16 is a schematic diagram illustrating an example of a visual indication on a communication device including an on-screen message and illumination of an indicator light that is provided after a call is detected if the auto-answer feature is enabled.
Figure 15:
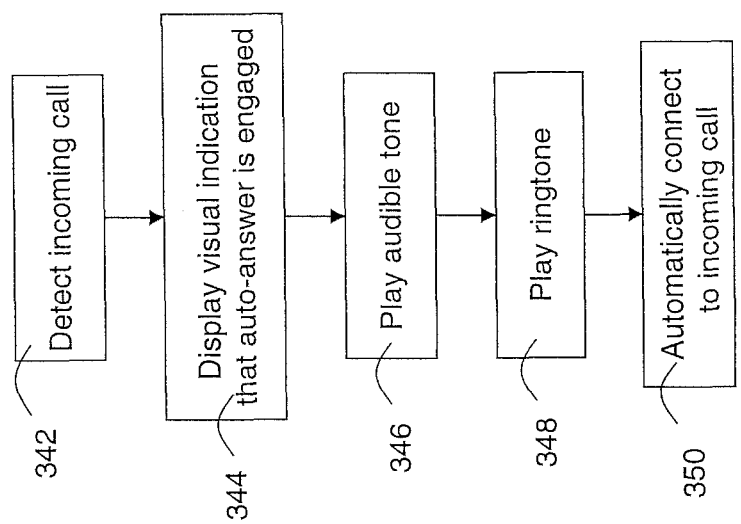
FIG. 15 is a flow diagram illustrating example computer executable instructions for providing the user a visual indication and an audible indication that the auto-answer feature is enabled before automatically answering the call.

Turning to FIG. 15 and FIG. 16, which illustrate an example of an indication that is provided to the user upon detection of a call when the auto-feature is engaged.

As is best seen from the flow diagram of FIG. 15, first, the mobile device 10 detects the call 342. The mobile device 10 then provides the user with a visual indication 344, followed by an audible tone 346, a ringtone 348, and then connects the incoming call 350. The visual indication 344 could include and a message on the display 110 as well as illumination of the indicator light 123. An example of the message displayed on the display 110 is provided in FIG. 16. The visual indication may continue until the call is connected, until the caller aborts the call or until the user manually rejects the call. The example message includes a component that explicitly indicates that the automatic answering feature is engaged 352 and a component that indicates the time until the incoming call is connected 354. An audible tone 346 that indicates that the automatic answering feature is enabled can be played through the speaker 118 or another speaker located elsewhere on the mobile device 10. The audible tone could include a ringtone that is distinct from the ringtone provided if the auto-answer feature is disabled that replaces the auto-answer disabled ringtone. If the audible tone includes a short tone that is played before the auto-answer disabled ringtone, the ringtone can then be played 348 until the call is automatically connected 350, or until the user rejects the call or the caller aborts the call. Once the call is connected, the call may be ended if no voice is detected, as illustrated above.

The example mobile device 10 in FIG. 16 includes a speaker 118, an indicator light 123, a keyboard 116 and a display 110. The display 110 is providing the user with a message that the auto-answer is engaged 352 and the amount of time until the mobile device answers the call 354. The keyboard 116 includes the manual connection 351 and disconnection 353 keys can be used to manually answer the call or end the call prior to the call being connected. The disconnection key can also be used to disconnect calls that have been connected via the automatic answering feature or through any other means.

Figures 17, 18:
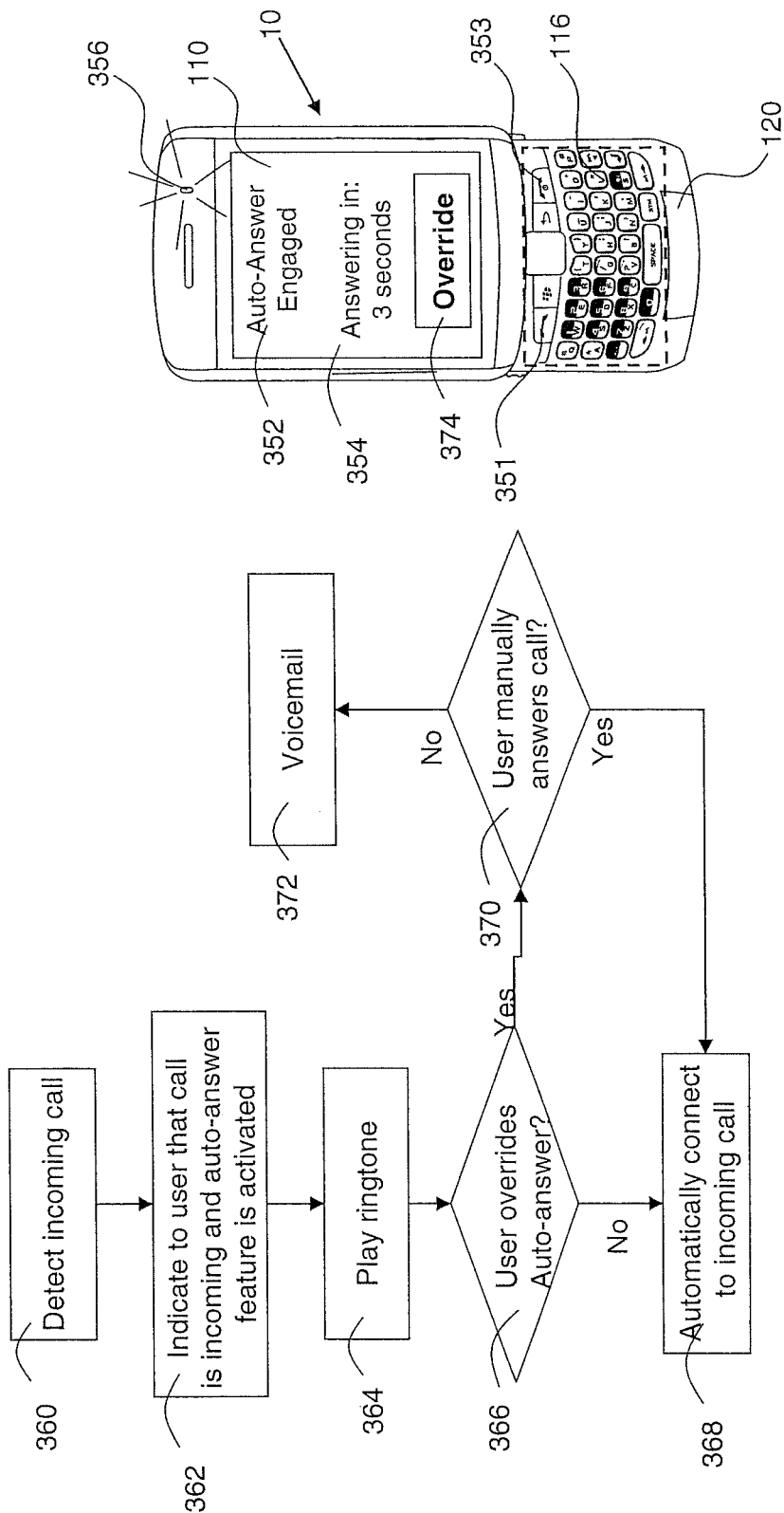
FIGS. 17 is a flow diagram illustrating example computer executable instructions for providing the user with the option to disable the auto-answer feature upon detection of an incoming call.
FIG. 18 is a schematic diagram illustrating an example of an override option shown with an indication similar to FIG. 16.

Referring to FIG. 17, which illustrates a method whereby the mobile device 10 detects a call 360, indicates to the user that the call is incoming and the automatic answering feature is activated 362, plays a ringtone 364 and an option is provided for the user to override the automatic answering feature while the ringtone is playing 366. Once the user overrides the automatic answering feature, it is determined if the use manually answers the call 370. For example, the user may wish to allow the call to be missed and go to voicemail 372 or manually answer the call, whereby the call would be connected 368. The system could optionally disable the automatic answering feature for future calls if the user decides to disable the automatic answering feature or override the automatic answering feature for only the call at hand. For instance, this could be utilized for overriding the automatic answering feature during an incoming call if the recipient is currently in a call with another party. FIG. 18 shows the mobile device 10 of FIG. 16 with an additional option 374 on the display 110 labelled "Override", which disables the automatic answering feature 366 as discussed above.

In order to have the automatic answering feature enabled when the function is useful to the user and disabled when the function is of no value to the user, a method of selectively enabling an auto-answer feature on the mobile device 10 according to a user-selectable profile is provided. Using a method that includes a set of rules dictating when to automatically answer a call and when to disable the automatic answering feature, the automatic answering feature can answer calls only under conditions where it is likely that the automatic answering feature is desirable. To accomplish this, the mobile device 10 receives input data, operates on the raw data and compares the result to a set of established rules that can optionally be modified by a user. If the rule is satisfied, the mobile device 10 modifies the state of the automatic answering feature according to the rule. If the rule is not met, the mobile device 10 leaves the settings untouched.

For example, a person with a disability may wish to always have the automatic answering feature enabled, as answering a call using conventional means may be difficult at all times. A person who is using the automatic answering feature while driving may wish to enable the automatic answering feature only when the mobile device 10 detects that the user is moving at a velocity greater than a certain threshold. By way of example, the mobile device 10 may calculate the three minute moving average and activate the automatic answering feature only when the three minute moving average has exceeded a certain threshold, and similarly deactivate the automatic answering feature only when the three minute moving average has decreased to below a certain threshold.

Figure 19:
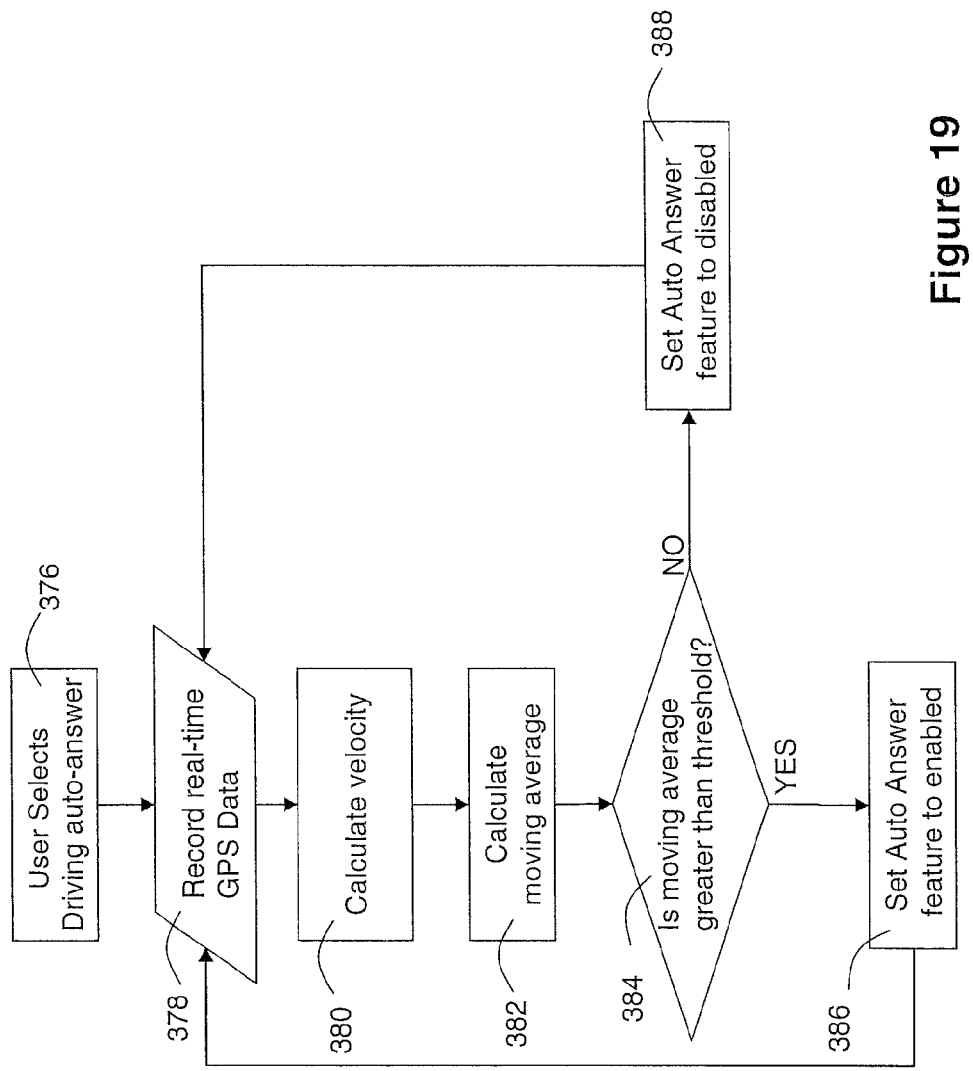
FIG. 19 is a flow diagram illustrating example computer executable instructions for selectively enabling the automatic answering feature depending on the velocity of the mobile device.

As is best seen in FIG. 19, the mobile device 10 calculates its velocity by accessing real-time GPS data through the GPS receiver 121. If the user has selected to enable the auto-answer feature while driving 376, the mobile device 10 records real-time GPS data 378, which is used to calculate the velocity 380, which, in turn, can be used to calculate the moving average 382 or some other metric which can be compared to a threshold set in a rule. If the minimum velocity threshold is met 384, the automatic answering feature is enabled 386. If this minimum velocity threshold has not been met, the automatic answering feature is disabled 388. In either case, the mobile device 10 continually monitors its velocity to determine whether to switch the state of the mobile device. The intervals at which the mobile device 10 receives its GPS coordinates can vary based on the recent data. For example, if the mobile device 10 begins to detect large changes in velocity, the GPS coordinates could be fetched at a greater frequency whereas if the mobile device detects no change in its velocity, the GPS coordinates could be fetched with reduced frequency to conserve battery power.

Figure 20:
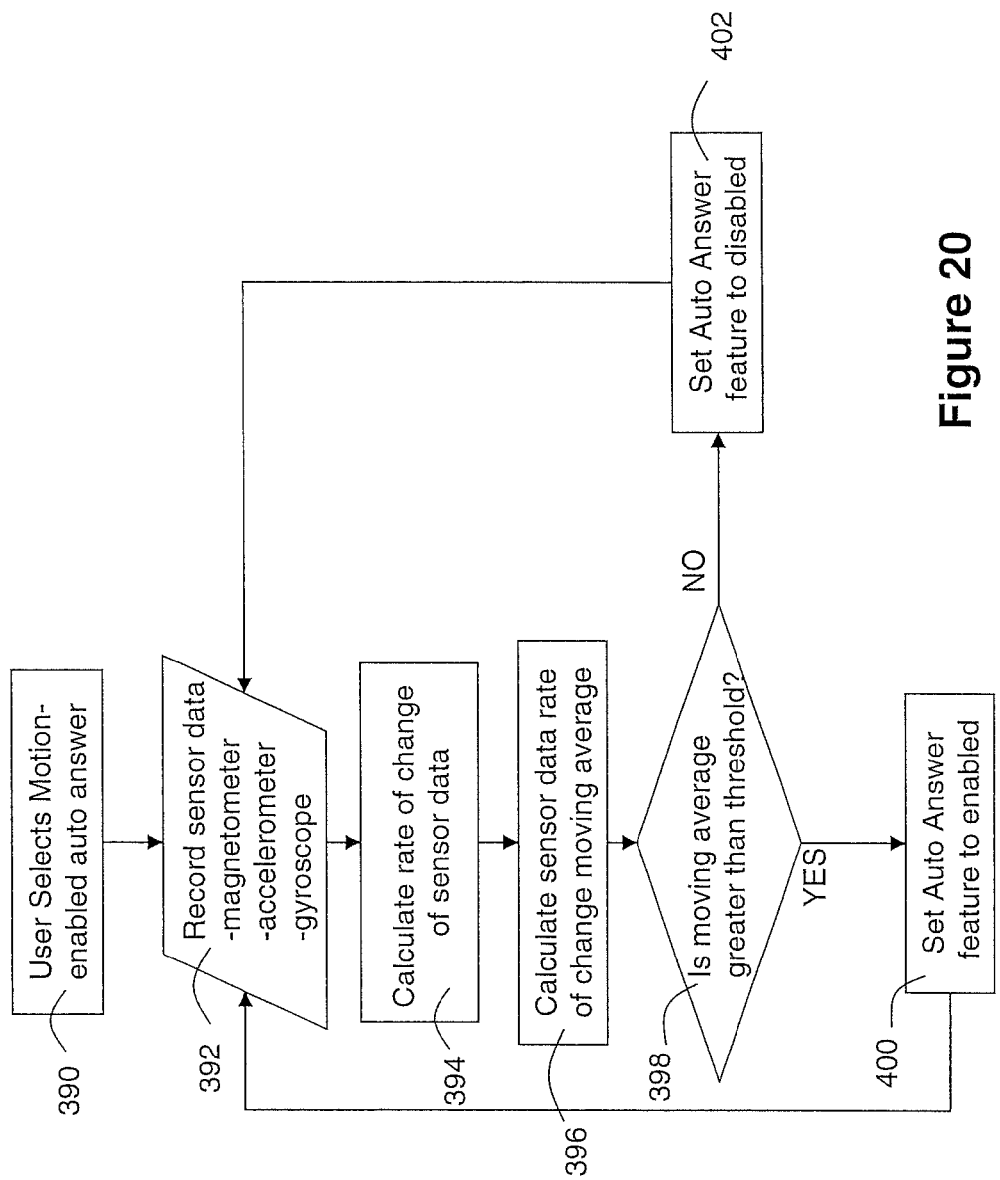
FIG. 20 is a flow diagram illustrating example computer executable instructions for selectively enabling the automatic answering feature depending on the motion measured by the mobile device's sensors.

Another rule that may be set to determine whether the automatic answering feature should be enabled or disabled a rule based on motion sensor readings. For instance, readings that come from an accelerometer, magnetometer, gyroscope, or any combination thereof may be used to determine whether the device is in motion or whether the device is stationary. A user can optionally set a mobile device 10 that is detected to be in motion based on the sensor data to automatically answer calls whereas a device that is stationary would not automatically answer calls. For example, the method may be useful for a user who wishes the automatic answering feature to answer calls while the mobile device 10 is on their person but not when the mobile device is left in a stationary location. Turning to FIG. 20, which is a method flow diagram outlining a method by which the automatic answering feature is enabled if the motion sensors have detected recent movement. First, the user activates the setting on the motion-activated automatic answering feature 390. The motion sensors 37 then collect and record data at a pre-determined or varying interval similar to the GPS data collection 392. The motion sensor data is then used to calculate a pre-determined metric that indicates the degree to which the device is moving 394. This metric can include historical averages such as a 10 second moving average 396. The metric is then compared to a threshold 398. If the motion metric does not exceed the threshold, the automatic answer feature is disabled 402; conversely if the motion metric does exceed the threshold, the automatic answer feature is enabled 400. Similarly to the GPS readings, the sampling frequency of the motion sensors 37 can vary to conserve battery power.

Figure 21:
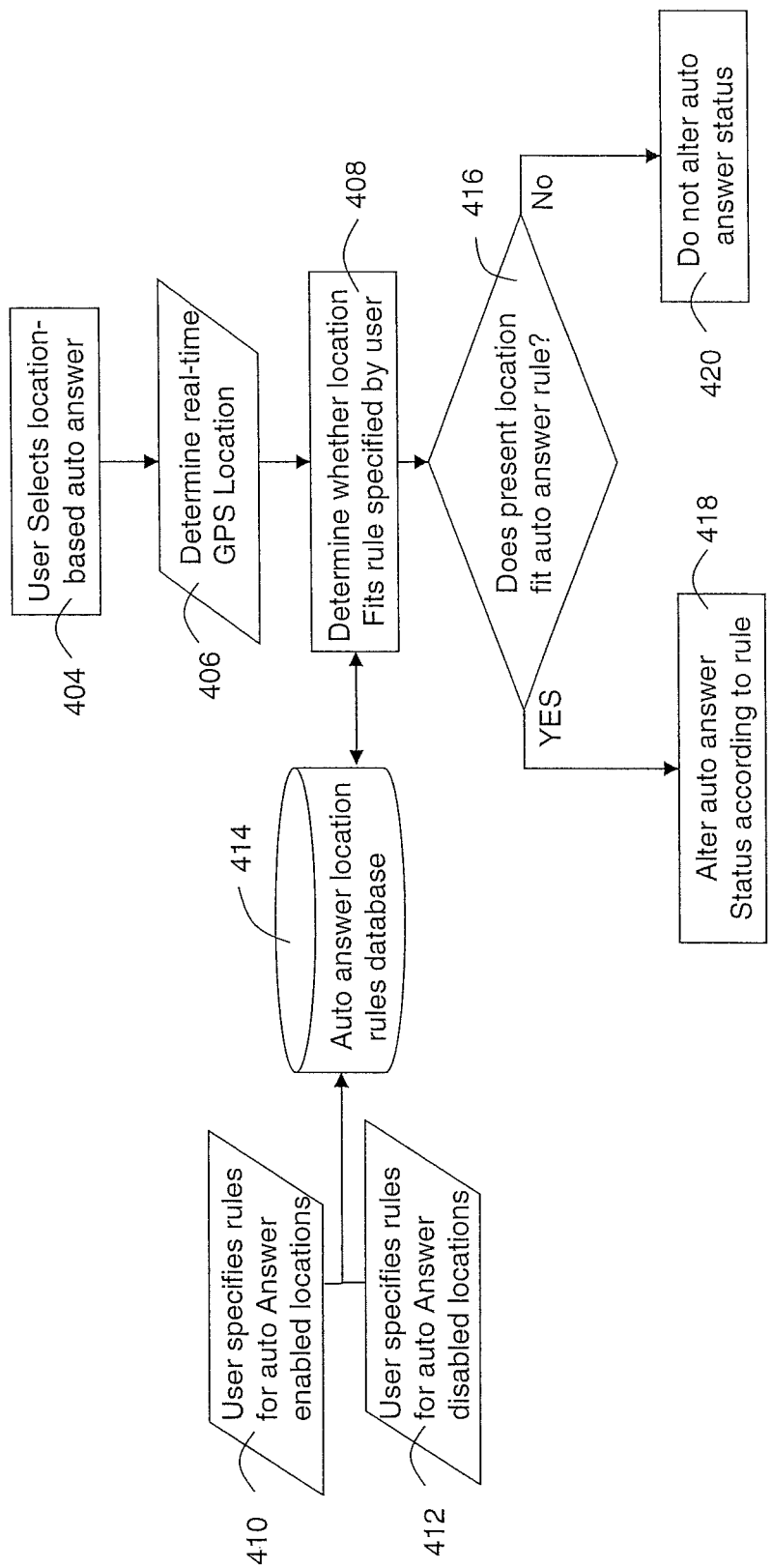
FIG. 21 is a flow diagram illustrating example computer executable instructions for selectively enabling the automatic answering feature depending on the location of the mobile device.

FIG. 21 shows a method for selectively enabling the automatic answering feature based on the location of the mobile device 10. The user can select locations where the automatic answering feature is enabled 410 and other locations where the automatic answering feature is disabled 412. These locations could be, by way of example, within 100 meters of the user's home and within 300 meters of the user's workplace. Alternately, the location could include a route or a general area. An example user profile could disable automatic answering within 100 meters of the user's home, within 300 meters of the user's workplace, but for everywhere else in the user's city and for major highways in the user's country, the automatic answer feature would be enabled. The locations and their associated automatic answering settings are stored in a location-based rules database 414. In operation, the user can enable the location-based automatic answering feature 404, which will proceed by determining the location of the mobile device 406. The location could be determined using mobile phone tracking, GPS coordinates or through any other method. The next step 408, has the mobile device 10 determine whether the location of the user fits a rule stored in the database 416. If a rule is satisfied, the automatic answering feature is altered according to the rule 418. If no rule is satisfied, the device does not alter the automatic answering status 420.

Figure 22:
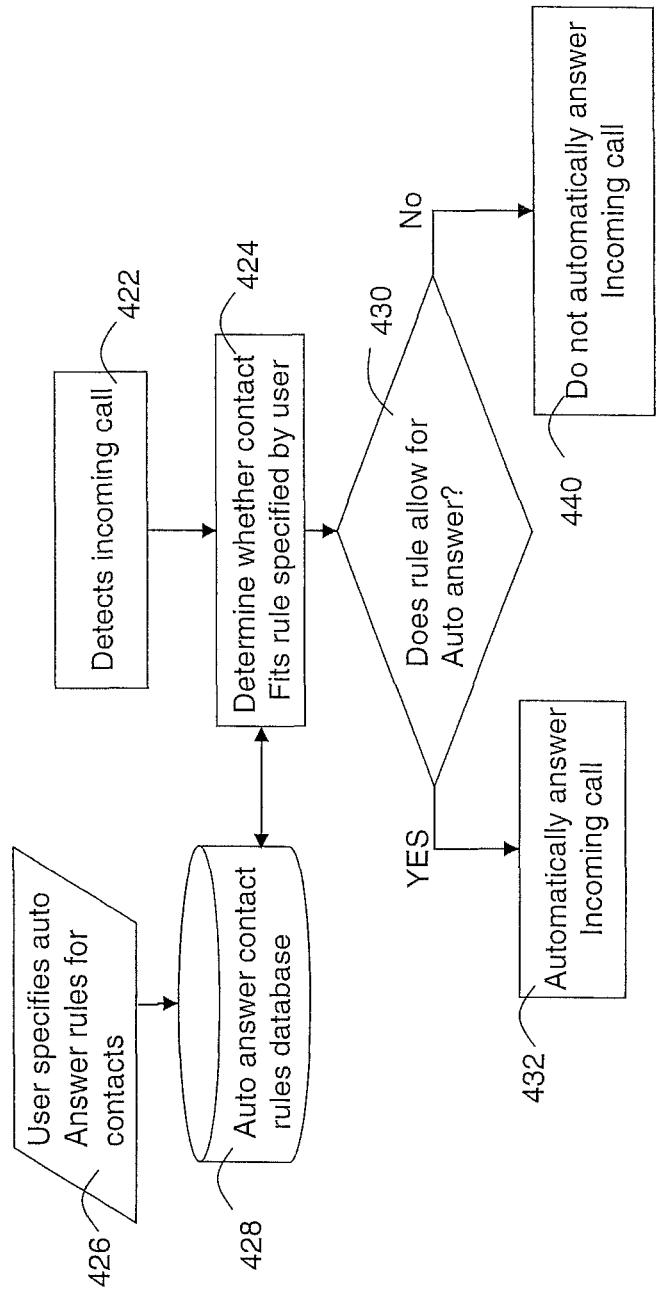
FIG. 22 is a flow diagram illustrating example computer executable instructions for selectively enabling the automatic answering feature depending on the caller's profile settings.

Since the automatic answering feature could interrupt the user in her activities, it may not be desirable for the mobile device 10 to automatically answer every incoming call. To this end, a flow diagram is presented in FIG. 22 that shows the method by which a user can specify whether the call should be automatically answered depending on the caller. The user may select a contact or a group of contacts for whom the automatic answering feature is enabled and the user may also select a contact or a group of contacts for whom the automatic answering feature is disabled 426. One group of contacts may include unknown callers and another group may include all callers not explicitly listed under other rules. These rules are stored in database 428. When the mobile device detects an incoming call 422, the mobile device 10 compares the caller ID to the rules in the database 428 to determine whether a rule exists for the contact making the incoming call 424. If the caller satisfies a rule enabling the automatic answering feature, the incoming call is automatically answered 432. Conversely, if the caller satisfies a rule disabling the automatic answering feature, the incoming call is not automatically answered 440. For instance, a user may set the automatic answering feature to enabled for family members but disabled for unknown callers.

The automatic answering feature may be enabled only when the mobile device 10 is not currently in use. Presumably, if the mobile device 10 is in use, for instance playing a video or browsing the web through the network 200, the user has the ability to manually answer incoming calls. Typically, to conserve battery power, the mobile device 10 can enter a standby mode that dims or switches off the display 110 and other select functions. To this end, the mobile device 10 could enable the automatic answering feature only while the mobile device 10 is in standby mode. Alternatively, if the mobile device 10 is set to automatically answer calls if the device is not in standby mode, the device could pause videos, music and mute other device sounds to allow the user to more easily receive indications of the incoming call as discussed above.

The user may also wish to selectively enable the automatic answering feature depending on the user's presence status.

For instance, if the user has set their presence status to "away", the user may not wish the mobile device 10 to automatically connect an incoming call. Alternatively, if the user sets their presence status to "available" or "driving", the user may wish to have the call automatically answered. Another method to adjust the user's presence status is through a calendar appointment 29. For instance, during a calendar appointment, a user's status may be automatically switched to "busy". The user's calendar information may also directly affect whether the automatic answering feature is enabled independently from the user's presence status.

Figure 23:
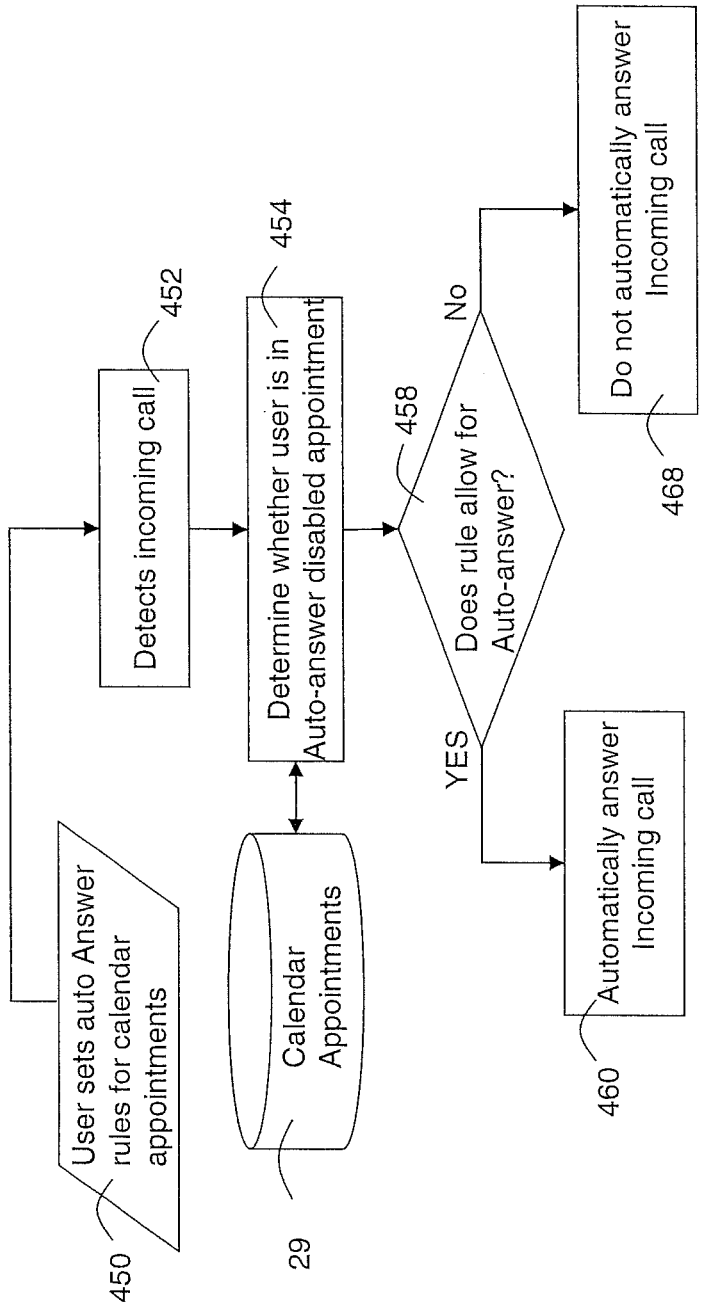
FIG. 23 is a flow diagram illustrating example computer executable instructions for selectively enabling the automatic answering feature depending on the recipient's calendar appointments.

FIG. 23 is a method flow diagram outlining the rules under which the automatic answering feature is enabled depending on calendar appointments 29 in the mobile device 10. First, the user selects an option to selectively enable the automatic answering feature depending on rules for calendar appointments 450. When the mobile device 10 detects an incoming call 452, it determines whether the user is currently scheduled in an appointment 454. If the user is scheduled in an appointment, the automatic answering feature may be disabled 468. Alternatively, depending on the user's settings, the automatic answering feature could be enabled 460 based on the appointment 29. The user may flag certain appointments 29 or appointments with certain contacts 29 to selectively enable the automatic answering feature depending on the user's settings.

Figure 24:
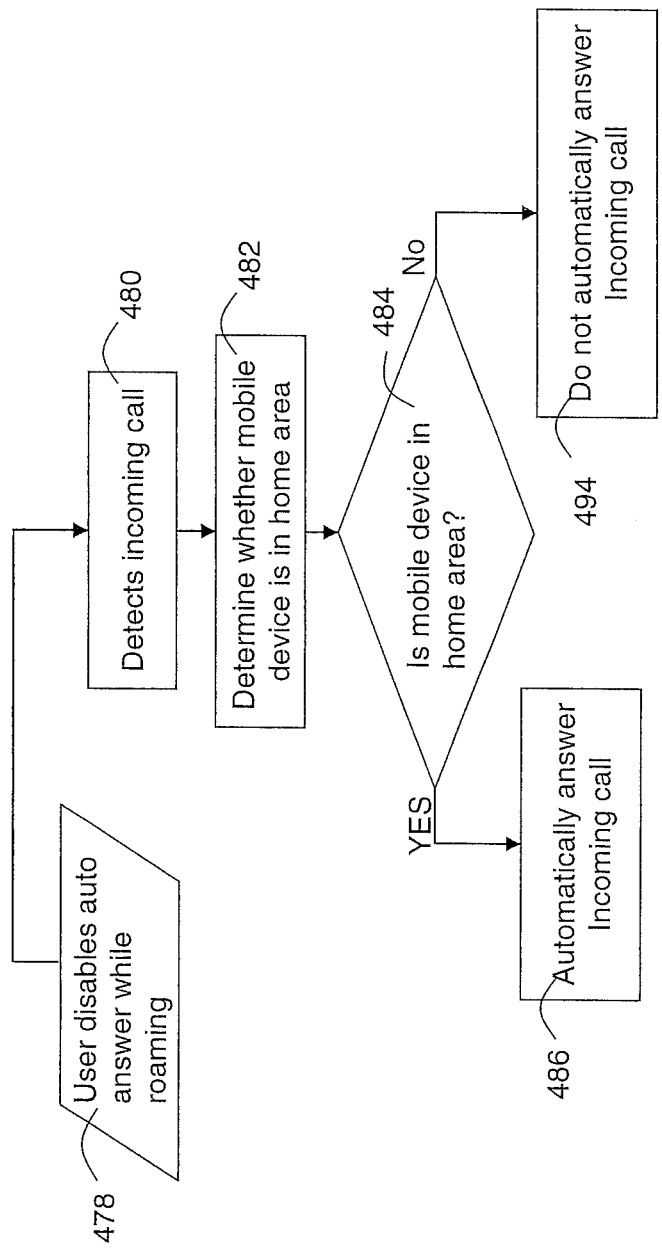
FIG. 24 is a flow diagram illustrating example computer executable instructions for selectively enabling the automatic answering feature depending on whether the recipient is roaming.

One implication of having an automatic answering feature is that additional charges may apply if the mobile device 10 is on a network 200 that is out of its home area, which is known to those familiar in the art as roaming. As illustrated in FIG. 24, to mitigate the charges associated with automatic answering while roaming, the user is provided with an option of disabling the automatic answering feature while the mobile device 10 is roaming 478. This option works by first detecting an incoming call 480 then determining whether the mobile phone is in its home area 482. This can be done with GPS data or information from the mobile device carrier that is received over the network 200. If the device is roaming, the automatic answering feature will be disabled 494 and the user will be required to manually intervene to answer the call. Conversely, if the device is not roaming, the automatic answering feature will be enabled 486 and the mobile device 10 automatically answers the incoming call.

Figure 25:
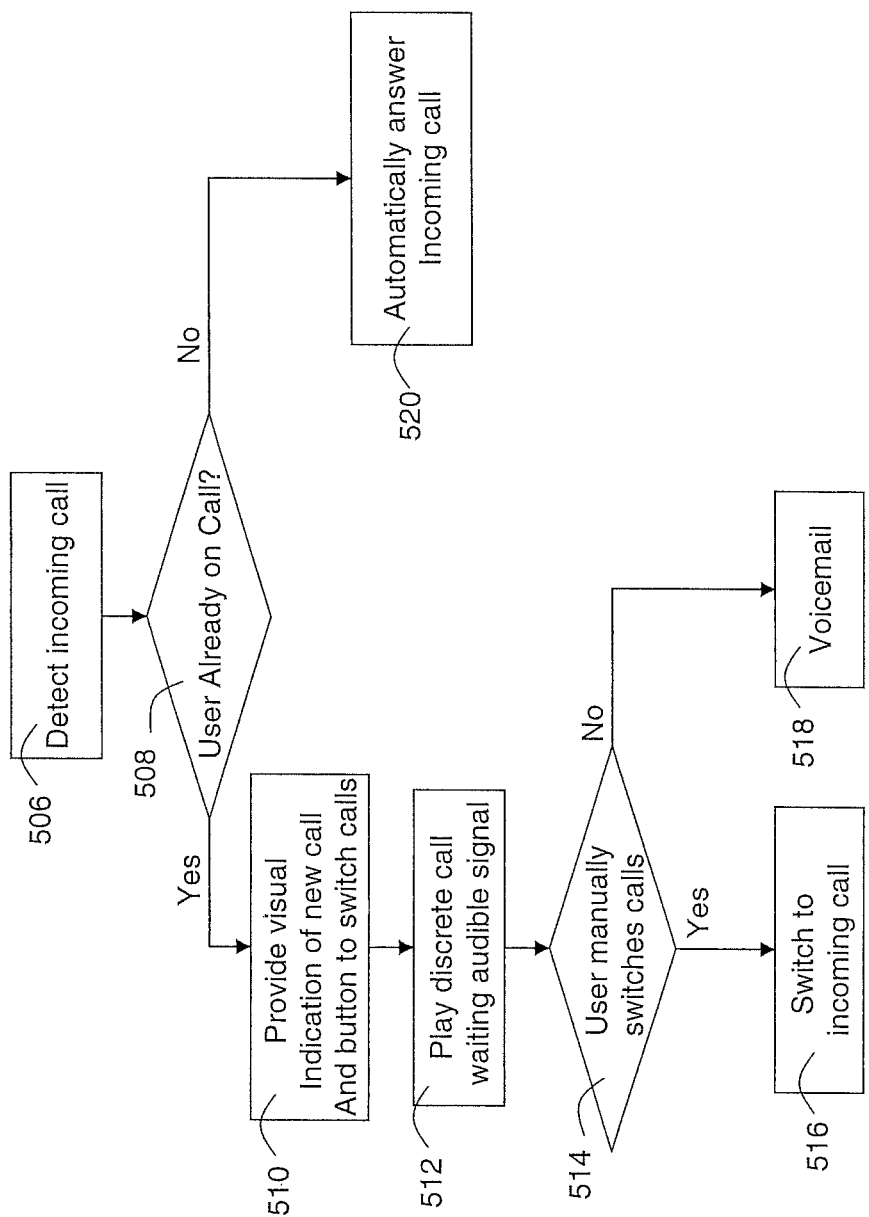
FIG. 25 is a flow diagram illustrating example computer executable instructions for disabling the automatic answering feature while the recipient is on a call.

Automatically answering a call can be problematic if the user is already on a call. To address this, the automatic answering feature could be enabled only when the user is not already on a call on the mobile device 10. To avoid the user being removed from his current call, the mobile device 10 detects the call 506 and then determines if the user is already on a call 508, as shown in the method flow diagram of FIG. 25. If the user is not on a call 508, the automatic answering feature proceeds 520. If, however, the user is on a call, a visual indication is provided along with a button to manually switch calls 510. The A discreet call waiting audible signal 512 can also be played to alert the recipient of the incoming call. The user can decide 514 to switch calls 516 or stay in the current call and let the incoming call go to voicemail 518. If the user is unable to press the button to change calls, the call can be sent to voicemail 518.

It can therefore be appreciated, that in general, the methods herein include a method for answering a call on a communication device 10, the method performed on a communication device including detecting an incoming call; automatically answering the incoming call; detecting whether an audio signal is received; and, if not, disconnecting the call. In another aspect, the audio signal includes voice. In another aspect, the audio signal exceeds a pre-determined threshold.

In another aspect, if a pre-determined number of calls are disconnected, the auto-answer feature is disabled for future calls. In another aspect, upon the auto-answer feature being disabled, the communication device provides an option to re-enable the auto-answer feature. In another aspect, the communication device indicates to the user whether the auto-answer feature is enabled upon detecting an incoming call. In another aspect, the communication device alerts the user if the auto-answer feature is disabled upon detecting an incoming call. In another aspect, upon detecting an incoming call, determining if a communication headset is in communication with the device and, if so, automatically answering the incoming call. In another aspect, an option is provided to override the auto-answer feature once the communication device detects the call. In another aspect, the method further includes the communication device determining if another call is already in progress, and if not, automatically answering the call.

The steps or operations in the flow diagrams described herein are just for example. There may be many variations to these steps or operations without departing from the spirit of the invention. For instance, the steps may be performed in a differing order, or steps may be added, deleted, or modified.

It can also be appreciated that the displays or screens described herein are just for example. There may be many variations to the configuration and arrangement of information and user interface controls without departing from the scope of the above principles. For instance, the information and the user interface controls may be in a differing order, or may be added, deleted, or modified.

Although the above has been described with reference to certain specific example embodiments, various modifications thereof will be apparent to those skilled in the art without departing from the scope of the claims appended hereto.

The invention claimed is:

1. A method for answering an incoming call performed by a communication device comprising:
   detecting the incoming call;
   automatically answering the incoming call;
   detecting whether an audio signal is received by the communication device;
   if not, disconnecting the incoming call;
   incrementing a number of consecutive calls that were automatically answered and disconnected when no audio signal was received by the communication device; and
   when the number equals a pre-determined number, disabling auto-answerinq.

2. The method of claim 1 wherein the audio signal comprises voice.

3. The method of claim 1 wherein the audio signal exceeds a pre-determined threshold.

4. The method of claim 1 wherein, after the auto-answering is disabled, the communication device provides an option to re-enable the auto-answering.

5. The method of claim 1 wherein the communication device indicates to the user whether the auto-answering is enabled after detecting the incoming call.

6. The method of claim 1 wherein the communication device alerts the user if the auto-answering is disabled after detecting the incoming call.

7. The method of claim 1 further comprising after detecting the incoming call, determining if a communication headset is in communication with the communication device and, if so, automatically answering the incoming call.

8. The method of claim 1 wherein an option is provided to override the auto-answering after the communication device detects the incoming call.

9. The method of claim 1 further comprising the communication device determining if another call is already in progress, and if not, automatically answering the incoming call.

10. A non-transitory computer readable medium for answering an incoming call on a communication device, the computer readable medium comprising computer executable instructions, the computer executable instructions comprising:
- detecting the incoming call;
- automatically answering the incoming call;
- detecting whether an audio signal is received by the communication device;
- if not, disconnecting the incoming call;
- incrementing a number of consecutive calls that were automatically answered and disconnected when no audio signal was received by the communication device; and
- when the number equals a pre-determined number, disabling auto-answering.

11. A communication device comprising a processor, means to connect to a communication network, one or more audio input mechanisms and a memory, the memory comprising computer executable instructions for:
- detecting an incoming call;
- automatically answering the incoming call;
- detecting whether an audio signal is received by the communication device;
- if not, disconnecting the incoming call;
- incrementing a number of consecutive calls that were automatically answered and disconnected when no audio signal was received by the communication device; and
- when the number equals a pre-determined number, disabling auto-answerinq.

12. The communication device of claim 11 further comprising instructions for determining whether the audio signal comprises voice and if not, disconnecting the incoming call.

13. The communication device of claim 11 further comprising instructions for determining whether the audio signal exceeds a pre-determined threshold.

14. The communication device of claim 11 wherein, after the auto-answering is disabled, the communication device provides an option to re-enable the auto-answering.

15. The communication device of claim 11 further comprising instructions for indicating to the user whether the auto-answering is enabled after detecting the incoming call.

16. The communication device of claim 11 further comprising instructions for alerting the user if the auto-answering is disabled after detecting the incoming call.

17. The communication device of claim 11 further comprising instructions for detecting the incoming call, determining if a communication headset is in communication with the communication device and, if so, automatically answering the incoming call.

18. The communication device of claim 11 further comprising instructions for providing the user with an option to override the auto-answering after the communication device detects the incoming call.

19. The communication device of claim 11 further comprising the communication device determining if another call is already in progress, and if not, automatically answering the incoming call.

* * * * *